(12) United States Patent
Miyazaki et al.

(10) Patent No.: US 12,147,097 B2
(45) Date of Patent: Nov. 19, 2024

(54) OPTICAL MODULATOR AND OPTICAL TRANSMISSION APPARATUS USING SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 303 days.

(21) Appl. No.: 17/764,022

(22) PCT Filed: Sep. 15, 2020

(86) PCT No.: PCT/JP2020/034974
§ 371 (c)(1),
(2) Date: Mar. 25, 2022

(87) PCT Pub. No.: WO2021/060087
PCT Pub. Date: Apr. 1, 2021

(65) Prior Publication Data
US 2022/0342241 A1 Oct. 27, 2022

(30) Foreign Application Priority Data
Sep. 26, 2019 (JP) ................. 2019-175516

(51) Int. Cl.
*G02F 1/03* (2006.01)
*G02F 1/01* (2006.01)
*G02F 1/035* (2006.01)

(52) U.S. Cl.
CPC .......... *G02F 1/0327* (2013.01); *G02F 1/0115* (2013.01); *G02F 1/0316* (2013.01); *G02F 1/035* (2013.01)

(58) Field of Classification Search
CPC .... G02F 1/0327; G02F 1/0114; G02F 1/0316; G02F 1/035
See application file for complete search history.

(56) References Cited

U.S. PATENT DOCUMENTS 4,448,479 A * 5/1984 Alferness .............. G02F 1/0356
385/28
6,741,379 B2 * 5/2004 Kaitoh .................. G02F 1/0356
359/254

(Continued)

FOREIGN PATENT DOCUMENTS

| JP | 2009-244325 | 10/2009 |
|---|---|---|
| JP | 2018-054929 | 4/2018 |

OTHER PUBLICATIONS

International Search Report, Date of mailing: Oct. 20, 2020, 2 pages.

*Primary Examiner* — Peter Radkowski
(74) *Attorney, Agent, or Firm* — Rankin, Hill & Clark LLP

(57) ABSTRACT

An optical modulator includes: an optical modulation element that is configured to generate two modulated light beams, each of which is modulated by two sets of electrical signals, and that includes a plurality of signal electrodes; a plurality of signal input terminals, each of which inputs an electrical signal; a relay substrate on which a plurality of signal conductor patterns and a plurality of ground conductor patterns are formed, the relay substrate being configured to propagate the two sets of electrical signals by two pairs of the adjacent signal conductor patterns; and a housing, in which the at least two signal conductor patterns including at least one parts mounting part including electrical circuit elements are configured such that first signal propagation directions, which are signal propagation directions at the parts mounting parts, are different from each other.

8 Claims, 13 Drawing Sheets

(56) References Cited

U.S. PATENT DOCUMENTS

| | | | | |
|---|---|---|---|---|
| 7,489,914 B2* | 2/2009 | Govind | ............... | H03B 5/1203 455/168.1 |
| 8,411,349 B2* | 4/2013 | Mitomi | ............... | G02F 1/2255 359/254 |
| 8,436,372 B2* | 5/2013 | Fujikawa | ............ | H01R 12/7076 257/E27.121 |
| 8,712,195 B2* | 4/2014 | Sugiyama | ............. | G02F 1/0327 359/254 |
| 8,849,071 B2* | 9/2014 | Kissa | ..................... | G02F 1/225 385/50 |
| 9,075,254 B2* | 7/2015 | Takemura | ............... | G02F 1/035 |
| 9,460,376 B2* | 10/2016 | Kato | ................... | G06K 19/0723 |
| 9,651,804 B2* | 5/2017 | Sugiyama | ............. | G02B 6/4215 |
| 9,830,552 B2* | 11/2017 | Kato | ............... | G06K 19/07786 |
| 10,175,553 B2* | 1/2019 | Ishii | ...................... | H01R 24/38 |
| 10,373,043 B2* | 8/2019 | Kato | .................... | H01L 23/552 |
| 2003/0151792 A1* | 8/2003 | Kaitoh | ................. | G02F 1/0305 359/279 |
| 2005/0248418 A1* | 11/2005 | Govind | ............... | H03H 7/1775 331/179 |
| 2010/0103058 A1* | 4/2010 | Kato | ..................... | H01L 23/552 343/702 |
| 2011/0157673 A1* | 6/2011 | Mitomi | ................ | G02F 1/2255 359/279 |
| 2011/0158576 A1* | 6/2011 | Kissa | ..................... | G02F 1/225 385/2 |
| 2011/0268382 A1* | 11/2011 | Takemura | ............ | G02F 1/0356 385/2 |
| 2011/0273091 A1* | 11/2011 | Fujikawa | ........... | H01R 13/2414 315/51 |
| 2012/0051683 A1* | 3/2012 | Sugiyama | .............. | G02F 1/035 385/1 |
| 2012/0301070 A1* | 11/2012 | Shimizu | ................ | G02F 1/0327 385/2 |
| 2013/0334321 A1* | 12/2013 | Kato | ...................... | H01L 23/66 235/493 |
| 2016/0161771 A1* | 6/2016 | Sugiyama | ............ | G02F 1/0316 385/3 |
| 2016/0358064 A1* | 12/2016 | Kato | ............... | G06K 19/07783 |
| 2017/0212402 A1* | 7/2017 | Ishii | ..................... | H01R 24/38 |
| 2017/0236049 A1* | 8/2017 | Kato | ...................... | H01Q 1/42 235/492 |
| 2018/0088361 A1* | 3/2018 | Sugamata | ............ | G02F 1/0327 |

* cited by examiner

DETAILS OF PART A

DETAILS OF PART C

DETAILS OF PART J

CROSS-SECTIONAL VIEW TAKEN ALONG ARROW LINE XVI-XVI

OPTICAL MODULATOR AND OPTICAL TRANSMISSION APPARATUS USING SAME

TECHNICAL FIELD

The present invention relates to an optical modulator including a relay substrate that relays propagation of an electrical signal between a signal input terminal and a signal electrode of an optical modulation element, and an optical transmission apparatus using the optical modulator.

BACKGROUND ART

In high-speed/large-capacity optical fiber communication systems, optical modulators incorporating waveguide type optical modulation elements are used in many cases. Particularly, optical modulation elements using $LiNbO_3$ (hereinafter, also referred to as LN) having electro-optic effects for substrates can realize high-bandwidth optical modulation characteristics with small optical losses, so the optical modulation elements are widely used in high-speed/large-capacity optical fiber communication systems.

The optical modulation element using the LN substrate includes Mach-Zehnder type optical waveguides and signal electrodes for applying a high-frequency electrical signal as a modulation signal to the optical waveguides. Then, the signal electrodes provided in the optical modulation element are connected to lead pins and connectors that are signal input terminals provided on a housing of the optical modulator, via a relay substrate provided in the housing in which the optical modulation element is accommodated. Thus, since the lead pins and connectors that are signal input terminals are connected to a circuit substrate on which an electronic circuit for causing the optical modulator to perform a modulation operation is mounted, an electrical signal output from the electronic circuit is applied to the signal electrodes of the optical modulation element via the relay substrate.

Due to the increasing transmission capacity in recent years, the main stream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into metro networks.

An optical modulator that performs QPSK modulation (QPSK optical modulator) and an optical modulator that performs DP-QPSK modulation (DP-QPSK optical modulator) include a plurality of Mach-Zehnder type optical waveguides having a so-called nested structure called a nested type, each of which includes at least one signal electrode. Therefore, the optical modulators include a plurality of signal electrodes, and the above-described DP-QPSK modulation operation is performed in cooperation with high-frequency electrical signals applied to the signal electrodes. Specifically, the DP-QPSK modulator is configured to generate two modulated light beams, each of which is modulated by a pair of high-frequency electrical signals, and these two modulated light beams are combined and output as one modulated light beam.

In such an optical modulator, an electrical circuit element such as an electric filter for improving high-frequency characteristics or the like may be mounted on a signal line formed on a relay substrate (Patent Literature Nos. 1 and 2).

FIG. 13 is a plan view illustrating an example of a configuration of an optical modulator including such a relay substrate on which an electrical circuit element is mounted in the related art. An optical modulator 2200 includes, for example, an optical modulation element 2202 which is a DP-QPSK modulator formed on an LN substrate, and a housing 2204 in which the optical modulation element 2202 is accommodated. Here, the housing 2204 includes a case 2214a and a cover 2214b. The optical modulator 2200 also includes an input optical fiber 2208 and an output optical fiber 2210 which are fixed to the case 2214a and perform an input and output of light to the optical modulation element 2202.

Four signal input terminals 2224a, 2224b, 2224c, and 2224d (hereinafter, collectively also referred to as a signal input terminal 2224) for inputting a high-frequency electrical signal for driving the optical modulation element 2202 from an external electronic circuit are further provided, in the case 2214a of the housing 2204. Specifically, the signal input terminal 2224 is, for example, a center electrode of electrical connectors 2216a, 2216b, 2216c, and 2216d (hereinafter, collectively also referred to as an electrical connector 2216) which are high-frequency coaxial connectors. The high-frequency electrical signals input from the respective signal input terminals 2224 are input to one ends of the four signal electrodes 2212a, 2212b, 2212c, and 2212d (hereinafter, collectively also referred to as a signal electrode 2212) provided in the optical modulation element 2202 via a relay substrate 2218 accommodated in the housing 2204, and terminated by a terminator 2220 with a predetermined impedance provided at the other end of the signal electrode 2212.

The optical modulation element 2202 outputs two modulated light beams from two output optical waveguides 2226a and 2226b, and the two output light beams are combined into one beam by a polarization-combining part 2228 including a polarization beam combining prism or the like. The combined light is output to the outside of the housing 2204 via the output optical fiber 2210.

FIG. 14 is a diagram illustrating the relay substrate 2218 and its periphery in the optical modulator 2200 illustrated in FIG. 13. Ground electrodes 2222a, 2222b, 2222c, 2222d, and 2222e are provided in the optical modulation element 2202 so that each of the signal electrodes 2212 form a coplanar waveguide (CPW).

Further, on the relay substrate 2218, the signal conductor patterns 2230a, 2230b, 2230c, and 2230d (hereinafter, collectively also referred to as a signal conductor pattern 2230) respectively connecting the four signal input terminals 2224 and the four signal electrodes 2212 of the optical modulation element 2202 are formed. These signal conductor patterns 2230 form a high-frequency signal line together with ground conductor patterns 2240a, 2240b, 2240c, 2240d, and 2240e arranged on the relay substrate 2218 so as to sandwich the signal conductor pattern 2230 in a plane direction of the substrate.

Each of the four signal conductor patterns 2230 of the relay substrate 2218 is provided with parts mounting parts 2250a, 2250b, 2250c, and 2250d (hereinafter, collectively also referred to as a parts mounting part 2250) on which an electric filter for improving high-frequency characteristics of the optical modulator 2200 is mounted, for example. FIG. 15 is a partial detailed view of a part J of the relay substrate 2218 illustrated in FIG. 14, and FIG. 16 is a cross-sectional view taken along arrow line XVI-XVI in FIG. 15. These drawings illustrate the configuration of the parts mounting part 2250b as an example of the parts mounting part 2250, and other parts mounting parts 2250*a*, 2250*c*, and 2250*d* may have the same configuration.

Similar to the electric filter described in Patent Literature No. 1, for example, the parts mounting part 2250*b* includes a thin film resistor 2252*b* (a hatched portion illustrated in FIGS. 15 and 16) formed as an electrical circuit element in a part of the signal conductor pattern 2230*b*, and a capacitor 2254*b* mounted on the signal conductor pattern 2230*b*. Further, the signal conductor pattern 2230*b* of the parts mounting part 2250*b* is formed wider than, for example, other portions.

The thin film resistor 2252*b* is formed with a portion of the signal conductor pattern 2230*b* with a desired thickness so that the portion has a desired resistance value, and is formed to be thinner than the thickness of the other portion, for example. Further, for example, the capacitor 2254*b* is a single plate capacitor, and a lower surface electrode portion of the capacitor is fixed on a wide portion of the signal conductor pattern 2230*b* connected to one end of the thin film resistor 2252*b*, for example, by soldering. On the other hand, for example, an upper surface electrode of the capacitor 2254*b* is connected over the wide portion of the signal conductor pattern 2230*b* connected to the other end of the thin film resistor 2252*b* by wire bonding using a conductor wire 2270. Thus, the parts mounting part 2250*b* constitutes an electric filter in which the thin film resistor 2252*b* and the capacitor 2254*b* are connected in parallel.

Here, as illustrated in FIG. 14, for example, arranging the parts mounting parts 2250, which are electric filters, so as to face each other in the same direction and at substantially the same clearance is suitable for manufacturing and inspection, and has been practiced in common sense in the related art.

Incidentally, the DP-QPSK optical modulator as described above is often used at a transmission rate of 100 Gb/s at present, and development to expand this transmission rate to 400 Gb/s or more is also in progress. With the increase in the frequency of the modulator operation, components with excellent high-frequency characteristics can be selected as the electrical circuit elements (capacitor 2254*b* or the like) mounted on the parts mounting part 2250 as described above, or the impedance of the parts mounting part 2250 is matched with the line impedance of the signal conductor pattern 2230.

However, the parts mounting part 2250 described above may cause disturbance in a high-frequency (microwave) electrical signal propagating in the signal conductor pattern 2230 due to, for example, a difference in physical shape between the electrical circuit element and the signal conductor pattern 2230, displacement of a mounting position of the electrical circuit element, and the like. As a result, a part of the microwave electrical signal leaks from the parts mounting part 2250 and becomes a leaked microwave 2290 (FIG. 14), which can act as noise on the adjacent signal conductor pattern 2230 and the signal electrode 2212 on the optical modulation element 2202.

Further, as described above, in the above-described configuration in which the parts mounting parts 2250 are arranged facing each other in the same direction and at substantially the same clearance as practiced in common sense in the related art, the leaked microwaves from the respective parts mounting parts 2250 can propagate with directivity pointing in substantially the same direction as each other. Further, in the case of an optical modulator configured to generate two modulated light beams, each of which is modulated by a pair of high-frequency electrical signals, such as a DP-QPSK optical modulator, since these high-frequency signals not only have substantially the same phase between paired high-frequency electrical signals, but also have substantially the same high-frequency components between different pairs, leaked microwaves with substantially the same phase and frequency components can be radiated from the parts mounting part 2250.

As a result, a new problem not expected in the 100 Gb/s transmission in the related art, in which the leaked microwaves interfere with each other and intensify each other, and act as electrical noise on the surrounding signal conductor pattern 2230 and the signal electrode 2212 of the optical modulation element 2202 connected to the surrounding signal conductor pattern 2230, may occur. Further, when the leaked microwave generated from the parts mounting part 2250 constituting the electric filter in a part of the signal conductor pattern 2230 is recombined to its own signal conductor pattern 2230 and the signal electrode 2212 of the optical modulation element 2202 connected to the signal conductor pattern 2230, not only it acts as electrical noise, but it may also cause additional problems such as deteriorating or changing the filter characteristics of the electric filter.

CITATION LIST

Patent Literature

[Patent Literature No. 1] Japanese Laid-open Patent Publication No. 2009-244325
[Patent Literature No. 2] Japanese Laid-open Patent Publication No. 2018-54929

SUMMARY OF INVENTION

Technical Problem

From the above background, in an optical modulator provided with an electrical circuit element such as an electric filter on a relay substrate that electrically connects the signal electrode of the optical modulation element and the signal input terminal, it is required to suppress electrical noise and deterioration or fluctuation of high-frequency characteristics caused by leaked microwaves that may be generated from the portion of the electrical circuit element, and to realize good modulation characteristics.

Solution to Problem

According to one aspect of the present invention, there is provided an optical modulator including: an optical modulation element that is configured to generate two modulated light beams, each of which is modulated by two sets of electrical signals, each set including two electrical signals, and that includes a plurality of signal electrodes; a plurality of signal input terminals, each of which inputs an electrical signal to be applied to each of the signal electrodes; a relay substrate on which a plurality of signal conductor patterns that electrically connect the signal input terminals to the signal electrodes and a plurality of ground conductor patterns are formed, the relay substrate being configured to propagate the two sets of electrical signals by two pairs of the signal conductor patterns, each of which is composed of two adjacent signal conductor patterns; and a housing in which the optical modulation element and the relay substrate are accommodated, in which at least two of the signal conductor patterns include at least one parts mounting part including an electrical circuit element, and the at least two signal conductor patterns including the parts mounting part are configured such that first signal propagation directions, which are signal propagation directions at the parts mounting parts, are different from each other.

According to another aspect of the present invention, at least one of the signal conductor patterns including the parts mounting part is configured such that a second signal propagation direction, which is a signal propagation direction at a connection part with the signal input terminal, is different from the first signal propagation direction, and/or is configured such that a portion where the signal propagation direction changes to a third signal propagation direction different from the first signal propagation direction is included in a section from a connection part with the signal electrode to the parts mounting part.

According to still another aspect of the present invention, the at least two signal conductor patterns including the parts mounting part include the two signal conductor patterns forming the pair, and the first signal propagation directions are different from each other between the two signal conductor patterns forming the same pair.

According to still another aspect of the present invention, all the signal conductor patterns each include the at least one parts mounting part, and the two signal conductor patterns forming the same pair are configured such that the first signal propagation directions are different from each other in each of the pairs.

According to still another aspect of the present invention, all the signal conductor patterns each are configured such that a second signal propagation direction, which is a signal propagation direction at a connection part with the signal input terminal, is different from the first signal propagation direction, and/or are configured such that a portion where the signal propagation direction changes to a third signal propagation direction different from the first signal propagation direction is included in a section from a connection part with the signal electrode to the parts mounting part.

According to still another aspect of the present invention, all the signal conductor patterns are configured such that the first signal propagation directions are different from each other.

According to still another aspect of the present invention, the parts mounting parts provided in each of all the signal conductor patterns are not arranged on a common straight line in the relay substrate.

According to still another aspect of the present invention, the electrical circuit element constituting the parts mounting part constitutes an electric filter.

According to still another aspect of the present invention, there is provided an optical transmission apparatus including the optical modulators described above and an electronic circuit that outputs an electrical signal for causing the optical modulator to perform a modulation operation.

This application claims the benefit of Japanese Patent Application No. 2019-175516 filed on Sep. 26, 2019, the disclosure of which is herein incorporated by reference in its entirety.

Advantageous Effects of Invention

According to the present invention, in an optical modulator provided with an electrical circuit element such as an electric filter on a relay substrate, it is possible to suppress electrical noise and deterioration or fluctuation of high-frequency characteristics caused by leaked microwaves that may be generated from portions of the electrical circuit element, and to realize good modulation characteristics.

DESCRIPTION OF EMBODIMENTS

Generally, a leaked microwave generated in a parts mounting part of a relay substrate spreads as a whole with the parts mounting part as a point wave source, but has directivity along a propagation direction of a high-frequency signal of a signal conductor pattern in the parts mounting part. The present invention realizes good modulation characteristics by suppressing the leaked microwave having the directivity from intensifying each other to act as electrical noise or recombination on its own signal conductor pattern to fluctuate high-frequency characteristics by setting the direction (extending direction) and position of the portion on the signal conductor pattern on which each parts mounting part is mounted to a predetermined direction and position. In the following description, a "direction of the leaked microwave" refers to a direction of the directivity of the leaked microwave.

Hereinafter, embodiments of the present invention will be described with reference to the drawings.

First Embodiment

Figure 1:
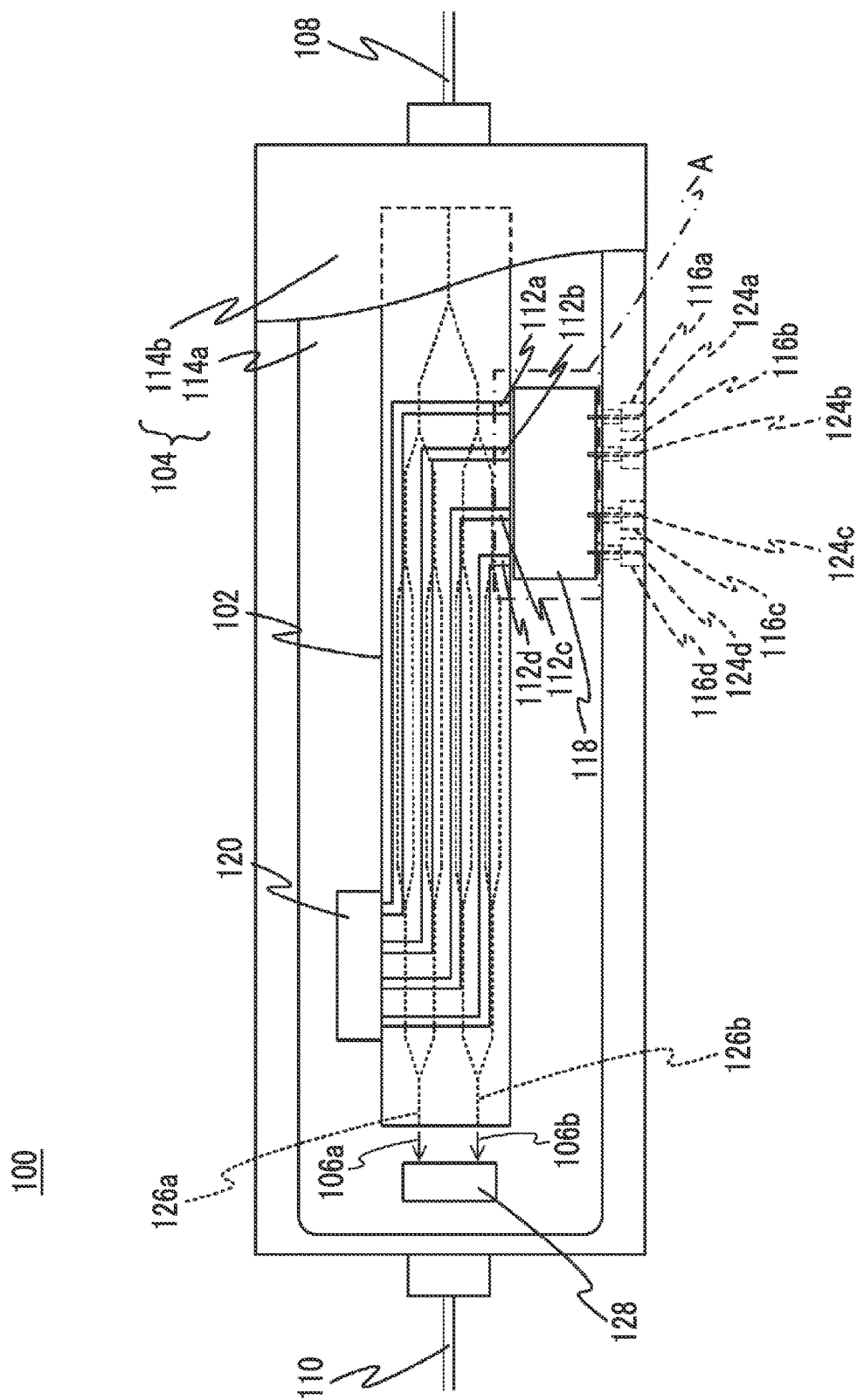
FIG. 1 is a plan view of an optical modulator according to a first embodiment of the present invention.
Figure 2:
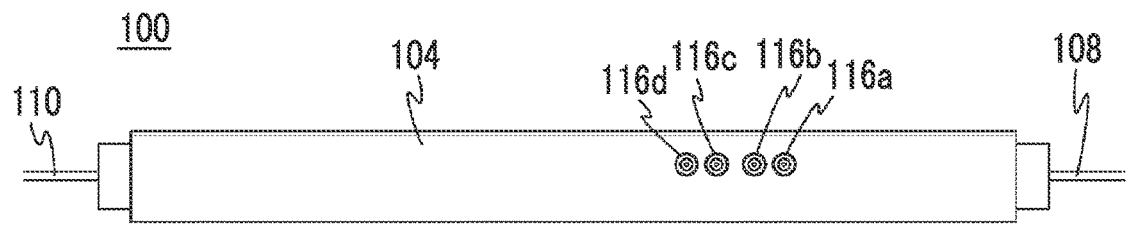
FIG. 2 is a side view of the optical modulator illustrated in FIG. 1.
Figure 3:
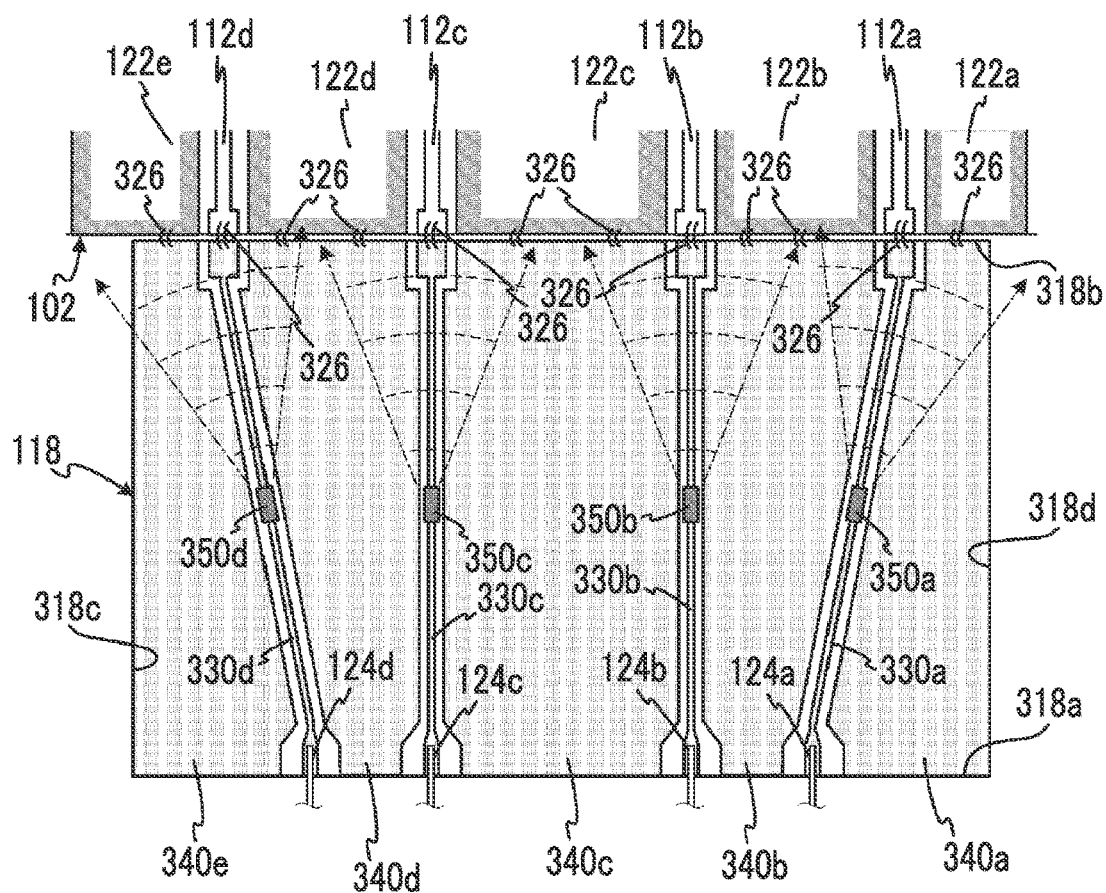
FIG. 3 is a detailed view of a part A of the optical modulator illustrated in FIG. 1.

First, a first embodiment of the present invention will be described. FIG. 1 is a plan view illustrating a configuration of an optical modulator 100 according to the first embodiment of the present invention, FIG. 2 is a side view of the optical modulator 100, and FIG. 3 is a partial detailed view of a part A in FIG. 1.

The optical modulator 100 includes an optical modulation element 102, a housing 104 in which the optical modulation element 102 is accommodated, an input optical fiber 108 for inputting light into the optical modulation element 102, and an output optical fiber 110 that guides the light output from the optical modulation element 102 to the outside of the housing 104.

The optical modulation element 102 is, for example, a DP-QPSK modulator that performs optical modulation of 400 Gb/s, and includes, for example, two nested type Mach-Zehnder optical waveguides, each of which is provided on an LN substrate, each including two Mach-Zehnder type optical waveguides. A total of four Mach-Zehnder type optical waveguides constituting these two nested type Mach-Zehnder optical waveguides are provided with four signal electrodes 112a, 112b, 112c, and 112d (hereinafter, collectively also referred to as a signal electrode 112) that respectively modulate light waves propagating through the Mach-Zehnder type optical waveguide. In addition, as known in the related art, on a surface of the LN substrate of the optical modulation element 102, for example, ground electrodes 122a, 122b, 122c, 122d, and 122e (see FIG. 3 and not illustrated in FIG. 1) are provided so that each of the four signal electrodes 112a, 112b, 112c, and 112d forms a coplanar waveguide (CPW).

Specifically, the ground electrodes 122a, 122b, 122c, 122d, and 122e (hereinafter, collectively also referred to as a ground electrode 122) are arranged to respectively sandwich the signal electrodes 112a, 112b, 112c, and 112d therebetween in a surface of the LN substrate, and form a coplanar waveguide having a predetermined characteristic impedance in a predetermined operating frequency together with the four signal electrodes 112a, 112b, 112c, and 112d.

Four high-frequency electrical signals (modulation signals) are respectively input to the four signal electrodes 112. These high-frequency electrical signals cooperate to control the propagation of the light wave in the four Mach-Zehnder type optical waveguides, and perform the operation of DP-QPSK modulation of 400 Gb/s as a whole.

Specifically, two pairs of high-frequency electrical signals, one pair of which includes two high-frequency electrical signals, are applied to the four respective signal electrodes 112. The optical modulation element 102 is configured to generate two modulated light beams 106a and 106b (arrows in FIG. 1) each of which is modulated by one pair of electrical signals. The two generated modulated light beams 106a and 106b are respectively output from two output optical waveguides 126a and 126b of the two nested type Mach-Zehnder optical waveguides that form the optical modulation element 102. In the present embodiment, two high-frequency electrical signals forming one pair are applied to the signal electrodes 112a and 112b to generate the modulated light 106a output from the output optical waveguide 126a, and other two high-frequency electrical signals forming another pair are applied to the signal electrodes 112c and 112d to generate the modulated light 106b output from the output optical waveguide 126b. These two modulated light beams 106a and 106b are combined into one beam by a polarization-combining part 128 including a polarization beam combining prism or the like, and then output to the outside of the housing 104 via the output optical fiber 110.

The housing 104 includes a case 114a to which the optical modulation element 102 is fixed and a cover 114b. In order to facilitate understanding of the configuration inside the housing 104, only a part of the cover 114b is illustrated on the right side in FIG. 1, but actually, the cover 114b is arranged to cover the entire box-shaped case 114a and hermetically seals the inside of the housing 104. The case 114a is made of a metal or a ceramic plated with gold, for example, and functions electrically as an electric conductor. The housing 104 can be usually provided with a plurality of pins for DC bias control or the like, which are omitted in FIG. 1.

In the case 114a, electrical connectors 116a, 116b, 116c, and 116d (hereinafter, collectively also referred to as electrical connectors 116), which are coaxial connectors including signal input terminals 124a, 124b, 124c, and 124d (hereinafter, collectively also referred to as a signal input terminal 124) that input the high-frequency electrical signal to be applied to each of the signal electrodes 112a, 112b, 112c, and 112d of the optical modulation element 102 are provided.

Each of the electrical connectors 116 is, for example, a socket for a push-on coaxial connector, including a cylindrical ground conductor, and the signal input terminal 124 includes a center conductor (core wire) extending along a center line of the cylindrical ground conductor. Each of the cylindrical ground conductors is electrically connected and fixed to the case 114a. Therefore, the case 114a constitutes a part of a ground line that supplies a ground potential. Further, each of the signal input terminals 124 is electrically connected to one end of each of the signal electrodes 112 of the optical modulation element 102, via a relay substrate 118.

The other end of the signal electrode 112 of the optical modulation element 102 is terminated by a terminator 120 having a predetermined impedance. Thus, the electrical signals input to the one ends of the signal electrodes 112 respectively propagate in the signal electrodes 112 as traveling waves.

FIG. 3 is a detailed view of a part A illustrated in FIG. 1, and illustrates a configuration of the relay substrate 118 and its surroundings. On the relay substrate 118, signal conductor pattern 330a, 330b, 330c, and 330d (hereinafter, collectively also referred to as a signal conductor pattern 330) and ground conductor pattern 340a, 340b, 340c, 340d, and 340e (hereinafter, collectively also referred to as a ground conductor pattern 340) are formed.

The signal conductor patterns 330a, 330b, 330c, and 330d connect the signal electrodes 112a, 112b, 112c, and 112d, respectively, and the corresponding signal input terminals 124, respectively. In particular, one pair of high-frequency electrical signals that generate the modulated light 106a are given to the signal electrodes 112a and 112b via the signal conductor patterns 330a and 330b adjacent to each other. Further, the other pair of high-frequency electrical signals that generate the modulated light 106b are given to the signal electrodes 112d and 112d via the signal conductor patterns 330c and 330d adjacent to each other. That is, the signal conductor patterns 330a and 330b form one pair of signal conductor patterns and propagate one pair (set) of high-frequency electrical signals, and the signal conductor patterns 330c and 330d form the other pair of signal conductor patterns and propagate the other pair (set) of high-frequency electrical signals.

On the relay substrate 118, a rear surface ground conductor (not illustrated) is formed on, for example, the entire surface of a rear surface facing a front surface (a surface illustrated in FIG. 3 in which the signal conductor pattern 330 and the ground conductor pattern 340 are formed). The rear surface ground conductor is fixed to the case 114a of the housing 104 with, for example, solder, a brazing material, a conductive adhesive, or the like. Thus, the rear surface ground conductor becomes a ground line component. Each of the ground conductor patterns 340 is connected to the rear surface ground conductor and connected to the ground line through an appropriate via (not illustrated).

The ground conductor patterns 340a, 340b, 340c, 340d, and 340e are respectively provided to sandwich the signal conductor patterns 330a, 330b, 330c, and 330d in a front surface of the relay substrate 118. Thus, each of the signal conductor patterns 330 and the ground conductor pattern 340 form a coplanar waveguide.

In the present embodiment, the signal conductor pattern 330 extends in an upward-downward direction illustrated in FIG. 3, and among sides of the relay substrate 118, one end of a side on a lower side illustrated in FIG. 3 is connected to the signal input terminal 124. Here, among the sides of the relay substrate 118, a side on which the signal conductor pattern 330 and the signal input terminal 124 are connected is referred to as a signal input side 318a.

Each of the signal electrodes 112 of the optical modulation element 102 is electrically connected to another end of the signal conductor pattern 330 of the relay substrate 118, on an upper side illustrated in FIG. 3 among sides of the relay substrate 118, by wire bonding using a conductor wire 326, for example. The conductor wire 326 can be a gold wire, for example. Here, among the sides of the relay substrate 118, a side on which the signal conductor pattern 330 and the signal electrode 112 of the optical modulation element 102 are connected is referred to as a signal output side 318b. In the present embodiment, the signal input side 318a and the signal output side 318b form two sides facing each other in the relay substrate 118 in a plan view. Among the sides of the relay substrate 118 in FIG. 3, the other two sides facing each other, other than the signal input side 318a and the signal output side 318b are referred to as side edges (lateral sides) 318c and 318d.

In the optical modulation element 102, the respective ground electrodes 122 that form the coplanar waveguide together with the signal electrodes 112 are electrically connected to one ends of the respective ground conductor patterns 340 at the signal output side 318b of the relay substrate 118, by wire bonding using the conductor wires 326, for example, in the same manner as described above. The wire bonding using the conductor wire 326 described above is an example, and the present invention is not limited thereto. Instead of wire bonding of the conductor wire 326, for example, ribbon bonding using a conductor ribbon such as a gold ribbon can be used.

The signal conductor patterns 330a, 330b, 330c, and 330d include, for example, parts mounting parts 350a, 350b, 350c, and 350d (hereinafter, collectively also referred to as a parts mounting part 350) which are portions (dark shaded portions illustrated in FIG. 3) provided with an electrical circuit element constituting an electric filter (a band-pass filter, a high-pass filter, and the like), respectively. Here, the electrical circuit element refers to an active element and/or a passive element serving as a functional element constituting the circuit, and does not include a wire pattern or a land (solder) provided exclusively for electrical connection.

For example, similar to the parts mounting part 2250 illustrated in FIGS. 13 to 16, the parts mounting part 350 may be configured by mounting an electrical circuit element such as a capacitor and/or forming an electrical circuit element such as a thin film resistor on a portion of the signal conductor pattern 330 provided wider than the others. That is, for example, similar to the signal conductor pattern 2230b illustrated in FIGS. 15 and 16, a wide portion is formed in the signal conductor pattern 330, a capacitor similar to the capacitor 2254b is mounted, and a thin film resistor similar to the thin film resistor 2252b is formed in a part of the wide portion of the signal conductor pattern 330, thereby configuring the parts mounting part 350. However, it is an example that the signal conductor pattern 330 is formed wide in the parts mounting part 350, and the signal conductor pattern 330 of the parts mounting part 350 can be formed in the same width as the others.

In the present embodiment, in particular, two signal conductor patterns 330 to which two paired high-frequency electrical signals are input are formed so as to extend at an angle to each other such that the signal propagation directions at the respective parts mounting parts 350 are different from each other. The signal propagation direction at the parts mounting part 350 corresponds to a first signal propagation direction.

Specifically, one signal conductor pattern 330a of the signal conductor patterns 330a and 330b to which the two high-frequency electrical signals forming one pair described above are input, respectively is formed so as to extend in a direction having an angle with respect to the extending direction of the other signal conductor pattern 330b (in the illustrated example, a direction inclined to the right in FIG. 3).

Generally, the direction of the leaked microwave generated from the parts mounting part 350 is along the signal propagation direction at the parts mounting part 350. Further, the signal propagation direction at the parts mounting part 350 is generally along the extending direction of the signal conductor pattern 330 in the portion of the signal conductor pattern 330 in which the parts mounting part 350 is formed.

In the present embodiment, since the signal conductor pattern 330a is formed in a direction having an angle with respect to the signal conductor pattern 330b, the directions of the leaked microwaves generated from the respective parts mounting parts 350a and 350b also have an angle with each other. For example, as illustrated in FIG. 3, the leaked microwaves generated from the parts mounting parts 350a and 350b have a large intensity distribution in a direction area centered on the extending direction of the signal conductor patterns 330a and 330b, as illustrated by the area sandwiched by the arrows of the two alternate long and short dash lines extending from each of the parts mounting parts 350a and 350b.

As a result, mutual interference of the leaked microwaves generated from the parts mounting parts 350a and 350b is suppressed, and it is avoided that these leaked microwaves intensify each other and act as electrical noise. That is, the generation of electrical noise due to the interference between the leaked microwaves generated from the parts mounting parts 350a and 350b is suppressed between the signal conductor patterns 330a and 330b in which the two paired high-frequency electrical signals that are likely to cause interference are propagated, respectively.

Similarly, one signal conductor pattern 330d of the signal conductor patterns 330c and 330d to which the two high-frequency electrical signals forming the other pair described above are input, respectively is formed so as to extend in a direction having an angle with respect to the extending direction of the other signal conductor pattern 330c (in the illustrated example, a direction inclined to the left in FIG. 3).

Thus, the leaked microwaves generated from the parts mounting parts 350c and 350d have a large intensity distribution in a direction area having the center in the extending direction of the signal conductor patterns 330c and 330d, as illustrated by the area sandwiched by the arrows of the two alternate long and short dash lines extending from each of the parts mounting parts 350c and 350d in FIG. 3.

As a result, the generation of electrical noise due to the interference between the leaked microwaves generated from the parts mounting parts 350c and 350d is suppressed even between the signal conductor patterns 330c and 330d in which the two paired high-frequency electrical signals that are likely to cause interference are propagated, respectively.

Here, in the relay substrate 118, for example, in the signal conductor patterns 330a and 330b to which paired high-frequency electrical signals are input, the signal propagation directions at the parts mounting parts 350a and 350b are configured to be separated from each other. However, the present invention is not limited thereto. As long as the signal propagation directions at the parts mounting part 350 are different from each other, they may be configured to approach each other.

Next, a modification example of the relay substrate used in the optical modulator 100 will be described.

First Modification Example

Figure 4:
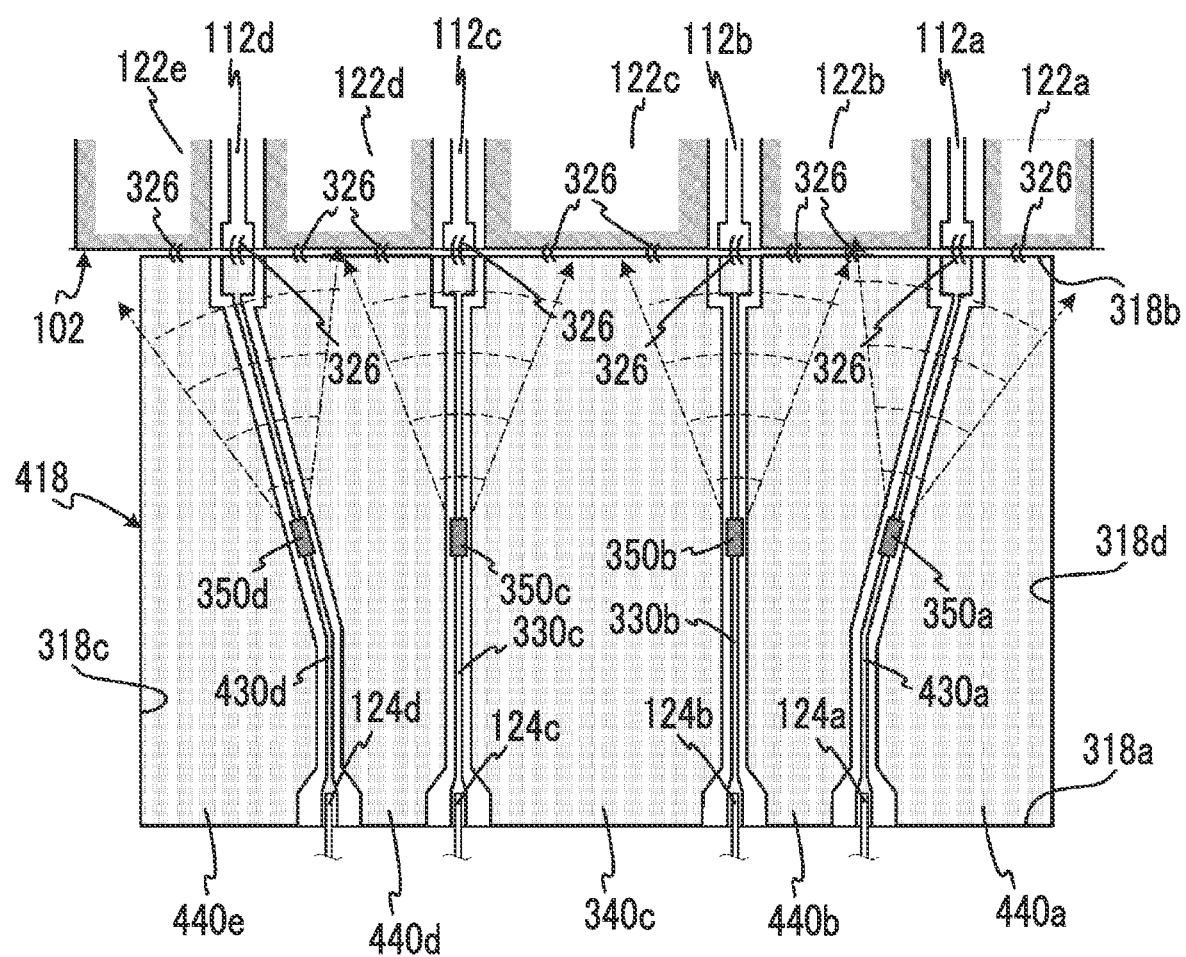
FIG. 4 is a diagram illustrating a configuration of a relay substrate according to a first modification example of the optical modulator according to the first embodiment.

FIG. 4 is a diagram illustrating a configuration of a relay substrate 418 according to a first modification example, and is a diagram corresponding to the partial detailed view of the first embodiment illustrated in FIG. 3. The relay substrate 418 can be used instead of the relay substrate 118 in the optical modulator 100 illustrated in FIG. 1. In FIG. 4, the same reference numerals as those in FIG. 3 are used for the same components as those of the relay substrate 118 illustrated in FIG. 3, and the above description of FIG. 3 will be incorporated herein.

The relay substrate 418 has the same configuration as the relay substrate 118 illustrated in FIG. 3, but is different from the relay substrate 118 in that it includes signal conductor patterns 430a and 430d instead of the signal conductor patterns 330a and 330d. Further, the relay substrate 418 is different from the relay substrate 118 in that it includes ground conductor patterns 440a, 440b, 440d, and 440e are provided instead of the ground conductor patterns 340a, 340b, 340d, and 340e.

The signal conductor patterns 430a and 430d have the same configuration as the signal conductor patterns 330a and 330d, but shapes thereof are different from those of the signal conductor patterns 330a and 330d. The ground conductor patterns 440a, 440b, 440d, and 440e have the same configuration as the ground conductor patterns 340a, 340b, 340d, and 340e, but since the ground conductor patterns 440a, 440b, 440d, and 440e form a coplanar waveguide together with the signal conductor patterns 430a and 430d, respectively, shapes thereof are different from those of the ground conductor patterns 340a, 340b, 340d, and 340e.

Specifically, the signal conductor patterns 430a and 430d have the same configuration as the signal conductor patterns 330a and 330d except for the extending directions of connection parts with the signal input terminals 124a and 124d.

Thus, in the relay substrate 418, similar to the relay substrate 118, the signal propagation directions at the parts mounting parts 350a and 350d are different from the signal propagation directions at the adjacent parts mounting parts 350b and 350c, respectively, so that intensifying interference between leaked microwaves generated from these parts mounting parts is suppressed between the parts mounting parts 350a and 350b and between the parts mounting parts 350c and 350d.

However, unlike the signal conductor patterns 330a and 330d, the signal conductor patterns 430a and 430d of the relay substrate 418 are not entirely linear, and the extending directions of the signal conductor patterns 430a and 430d at the connection parts with the signal input terminals 124a and 124d formed in the vicinity of the signal input side 318a are different from the extending directions of the parts mounting parts 350a and 350d, respectively. Here, the signal propagation direction at the connection part between the signal conductor patterns 330, 430a, and 430d and the signal input terminals 124 corresponds to a second signal propagation direction.

That is, in the relay substrate 418, regarding the signal conductor patterns 430a and 430d, the signal propagation directions at the parts mounting parts 350a and 350d and the signal propagation directions at the connection parts with the signal input terminals 124a and 124d are different from each other, respectively. For example, in the relay substrate 418, the signal conductor patterns 430a and 430d are formed such that the extending directions at the connection parts with the signal input terminals 124a and 124d are parallel to the signal conductor patterns 330b and 330c (or parallel to side edges 318c and 318d), and thereby, the extending directions are different from the extending directions at the parts mounting parts 350a and 350d.

Thus, in the relay substrate 418, the direction of the leaked microwave generated at the connection part and the direction of the leaked microwave generated at the parts mounting part 350a are different from each other. Therefore, in the relay substrate 418, interference between two leaked microwaves (that is, in the signal conductor pattern 430a, two leaked microwaves generated at the connection parts with the signal input terminal 124a and the parts mounting part 350a, respectively), which are likely to cause interference, that occur in two different portions of one signal conductor pattern 430a is also suppressed.

Further, also in the signal conductor pattern 430d, similar to the signal conductor pattern 430a, the directions of the two leaked microwaves generated at each of the connection part with the signal input terminal 124d and the parts mounting part 350d are different from each other. Therefore, interference between the leaked microwaves is suppressed.

As a result, in the relay substrate 418, the generation of electrical noise caused by the leaked microwaves generated from the parts mounting part 350 is further suppressed as compared with the relay substrate 118.

Second Modification Example

Next, a second modification example of the relay substrate used in the optical modulator 100 will be described.

Figure 5:
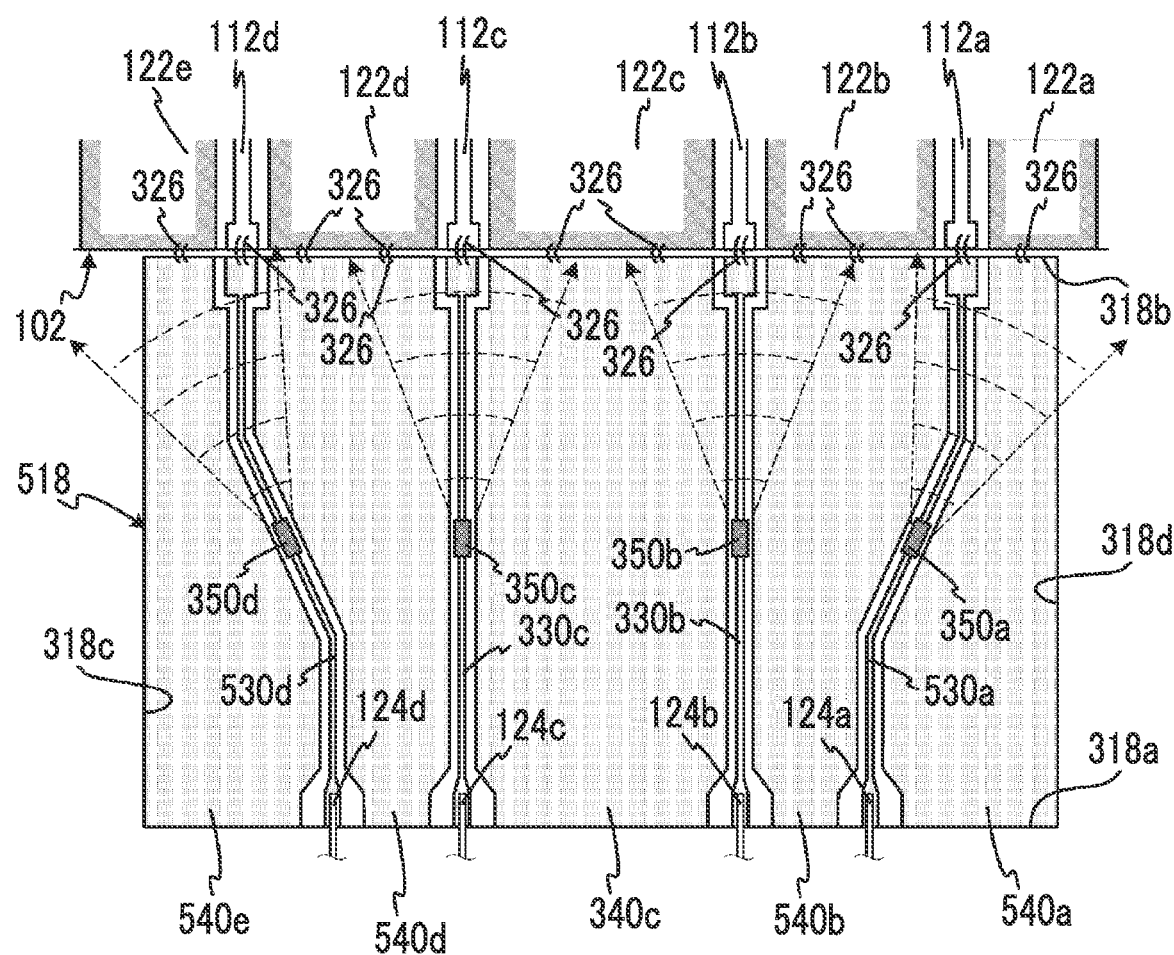
FIG. 5 is a diagram illustrating a configuration of a relay substrate according to a second modification example of the optical modulator according to the first embodiment.

FIG. 5 is a diagram illustrating a configuration of a relay substrate 518 according to the second modification example, and is a diagram corresponding to the partial detailed view of the first embodiment illustrated in FIG. 3. The relay substrate 518 can be used instead of the relay substrate 118 in the optical modulator 100 illustrated in FIG. 1. In FIG. 5, the same reference numerals as those in FIG. 3 are used for the same components as those of the relay substrate 118 illustrated in FIG. 3, and the above description of FIG. 3 will be incorporated herein.

The relay substrate 518 has the same configuration as the relay substrate 118 illustrated in FIG. 3, but is different from the relay substrate 118 in that it includes signal conductor patterns 530a and 530d instead of the signal conductor patterns 330a and 330d. Further, the relay substrate 518 is different from the relay substrate 118 in that it includes ground conductor patterns 540a, 540b, 540d, and 540e are provided instead of the ground conductor patterns 340a, 340b, 340d, and 340e.

The signal conductor patterns 530a and 530d have the same configuration as the signal conductor patterns 330a and 330d, but shapes thereof are different from those of the signal conductor patterns 330a and 330d. The ground conductor patterns 540a, 540b, 540d, and 540e have the same configuration as the ground conductor patterns 340a, 340b, 340d, and 340e, but since the ground conductor patterns 540a, 540b, 540d, and 540e form a coplanar waveguide together with the signal conductor patterns 530a and 530d, respectively, shapes thereof are different from those of the ground conductor patterns 340a, 340b, 340d, and 340e.

Specifically, the signal conductor patterns 530a and 530d have the same configuration as the signal conductor patterns 430a and 430d according to the first modification example illustrated in FIG. 4, except for the shapes of the sections from the connection parts with the signal electrodes 112a and 112d to the parts mounting parts 350a and 350d.

Thus, in the relay substrate 518, similar to the relay substrate 418 illustrated in FIG. 4, interference between leaked microwaves generated between the parts mounting parts 350a and 350b and between the parts mounting parts 350c and 350d is suppressed, and interference between leaked microwaves between the portion of the signal conductor pattern 530a to which the signal input terminal 124a is connected and the parts mounting part 350a and between the portion of the signal conductor pattern 530d to which the signal input terminal 124d is connected and the parts mounting part 350a is also suppressed. Therefore, it is possible to suppress the generation of electrical noise caused by these interferences.

However, unlike the signal conductor patterns 430a and 430d according to the first modification example illustrated in FIG. 4, the signal conductor patterns 530a and 530d of the relay substrate 518 are configured such that, in sections from the connection parts with the signal electrodes 112a and 112d on the signal output side 318b to the parts mounting parts 350a and 350d, portions where the extending directions of the signal conductor patterns 530a and 530d in the sections, that is, the signal propagation directions in the sections change in a direction different from the signal propagation directions at the parts mounting parts 350a and 350d are included in the sections.

Thus, in the relay substrate 518, the signal conductor patterns 530a and 530d include a portion having a signal propagation direction different from the direction of the leaked microwaves generated from the parts mounting parts 350a and 350d in the corresponding sections, respectively. Therefore, it is possible to suppress the leaked microwaves generated from the parts mounting parts 350a and 350d provided in the signal conductor patterns 530a and 530d from recombination to the same signal conductor patterns 530a and 530d, respectively. This suppression of recombination is due to the fact that the leaked microwave is generally less likely to combine to the propagation mode in the conductor pattern having a signal propagation direction different from the direction of the leaked microwave.

Generally, when the recombination of the leaked microwave occurs from each of the parts mounting parts 350a and 350d to their own signal conductor patterns 530a and 530d, for example, the high-frequency characteristics (frequency characteristics) of each of the signal conductor patterns 530a and 530d including the parts mounting parts 350a and 350d, which are electric filters, as a whole, may be fluctuated to affect the modulation operation of the optical modulator 100.

On the other hand, in the relay substrate 518 having the above configuration, in addition to the above-mentioned suppression of electrical noise, the recombination can be effectively suppressed as described above, and thus it is possible to suppress the fluctuation of the high-frequency characteristics due to the recombination, and to realize a good modulation operation.

In signal propagation directions of the signal conductor patterns 530a and 530b in sections from the connection parts with the signal electrodes 112 to the parts mounting parts 350, the signal propagation direction after changing in a direction different from the signal propagation direction of the corresponding parts mounting part 350 corresponds to a third signal propagation direction.

Third Modification Example

Next, a third modification example of the relay substrate used in the optical modulator 100 will be described.

Figure 6:
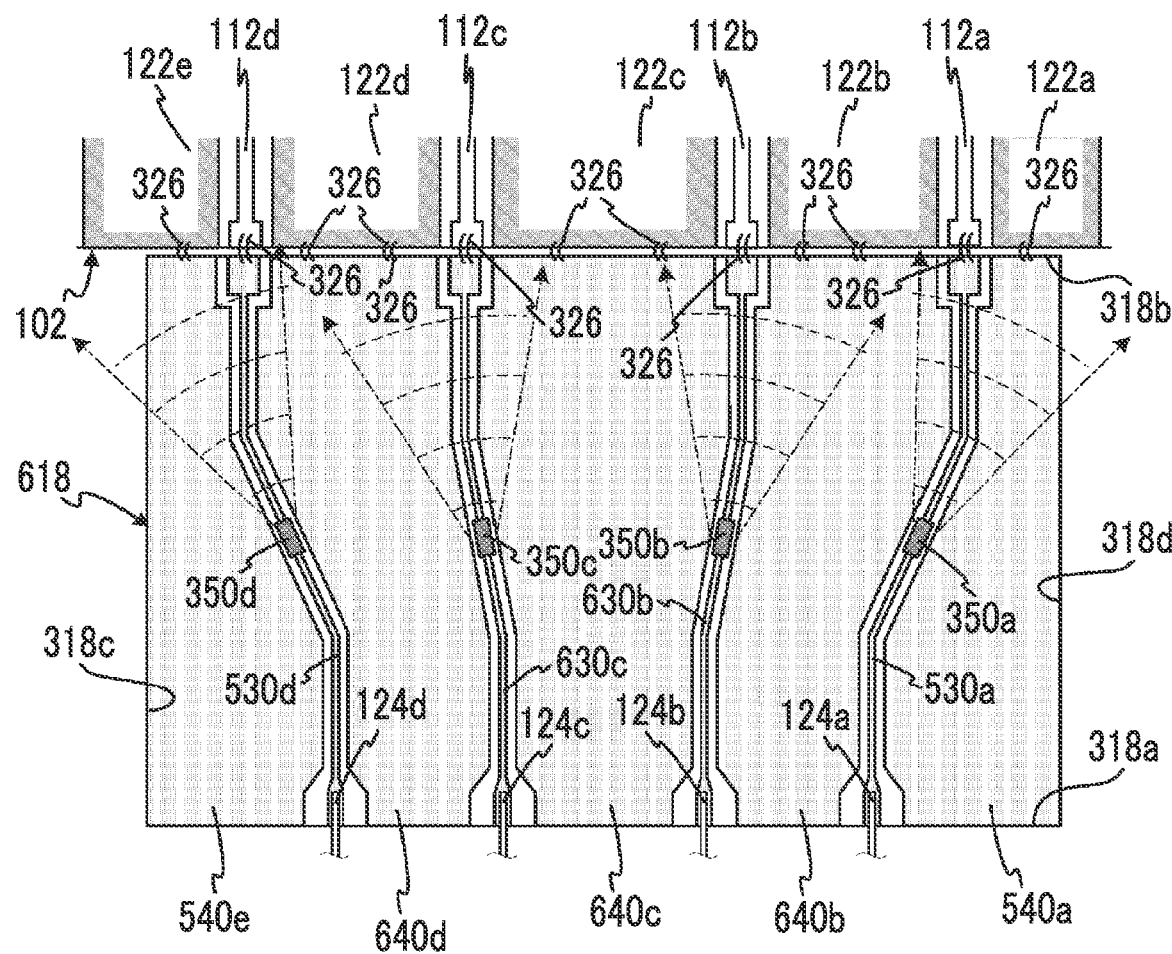
FIG. 6 is a diagram illustrating a configuration of a relay substrate according to a third modification example of the optical modulator according to the first embodiment.

FIG. 6 is a diagram illustrating a configuration of a relay substrate 618 according to the third modification example, and is a diagram corresponding to the partial detailed view of the first embodiment illustrated in FIG. 3. The relay substrate 618 can be used instead of the relay substrate 118 in the optical modulator 100 illustrated in FIG. 1. In FIG. 6, the same reference numerals as those in FIGS. 3 and 5 are used for the same components as those of the relay substrate 118 illustrated in FIG. 3 and the components of the relay substrate 518 according to the second modification example illustrated in FIG. 5, respectively, and the above description of FIGS. 3 and 5 will be incorporated herein.

The relay substrate 618 has the same configuration as the relay substrate 518 illustrated in FIG. 5, but is different from the relay substrate 518 in that it includes signal conductor patterns 630b and 630c instead of the signal conductor patterns 330b and 330c. Further, the relay substrate 618 is different from the relay substrate 518 in that it includes ground conductor patterns 640b, 640c, and 640d instead of the ground conductor patterns 540b, 540c, and 540d.

The signal conductor patterns 630b and 630c have the same configuration as the signal conductor patterns 330b and 330c, but shapes thereof are different from those of the signal conductor patterns 330b and 330c. The ground conductor patterns 640b, 640c, and 640d have the same configuration as the ground conductor patterns 540b, 540c, and 540d, but since the ground conductor patterns 640b, 640c, and 640d form a coplanar waveguide together with the signal conductor patterns 630b and 630c, shapes thereof are different from those of the ground conductor patterns 540b, 540c, and 540d.

Specifically, the signal conductor patterns 630b and 630c have the same configuration as the signal conductor patterns 330b and 330c, but are not linear and are different from the signal conductor patterns 330b and 330c in that they have the same shape as the signal conductor patterns 530a and 530d.

That is, the signal conductor patterns 630b and 630c are formed such that the signal propagation directions at the parts mounting parts 350b and 350c are different from the signal propagation directions at the parts mounting parts 350a and 350d of the adjacent signal conductor patterns 530a and 530b, respectively. Here, the signal conductor patterns 530a and 630b, and 630c and 530d are configured to propagate paired high-frequency electrical signals, respectively.

Further, the signal conductor patterns 630b and 630c are formed such that the signal propagation directions at the connection parts with the signal input terminals 124b and 124c are different from the signal propagation directions at the parts mounting parts 350b and 350c, respectively. Further, the signal conductor patterns 630b and 630c are configured such that, in sections from the connection parts with the signal electrodes 112b and 112c of the optical modulation element 102 to the parts mounting parts 350b and 350c, portions where the extending directions of the conductor patterns in the sections, that is, the signal propagation directions in the sections change in a signal propagation direction different from the signal propagation directions at the parts mounting parts 350b and 350c are included in the sections.

With the above configuration, in the present modification example, also in the signal conductor patterns 630b and 630c, similar to the signal conductor patterns 530a and 530d, interference between these leaked microwaves can be suppressed by making the direction of the leaked microwaves from the connection parts with the signal input terminals 124b and 124c different from the direction of the leaked microwaves from the parts mounting parts 350b and 350c. Thus, in the relay substrate 618, the electrical noise caused by the interference between the leaked microwaves can be further reduced as compared with the relay substrate illustrated in FIG. 5.

Further, in the present modification example, similar to the signal conductor patterns 530a and 530d, the signal conductor patterns 630b and 630c also have a portion in the sections up to the connection parts with the signal electrodes 112b and 112c of the optical modulation element 102, in which the signal propagation direction changes in a direction different from the signal propagation directions at the parts mounting parts 350b and 350c. Therefore, the leaked microwaves generated from the parts mounting parts 350b and 350c are suppressed from being recombined with their own signal conductor patterns 630b and 630c. Therefore, also in each of the signal conductor patterns 630b and 630c, fluctuations in the high-frequency characteristics as a whole including, for example, the parts mounting parts 350b and 350c constituting the electric filter are suppressed.

As a result, in the relay substrate 618, it is possible to realize a better optical modulation operation than the relay substrate 518 illustrated in FIG. 5.

Fourth Modification Example

Next, a fourth modification example of the relay substrate used in the optical modulator 100 will be described.

Figure 7:
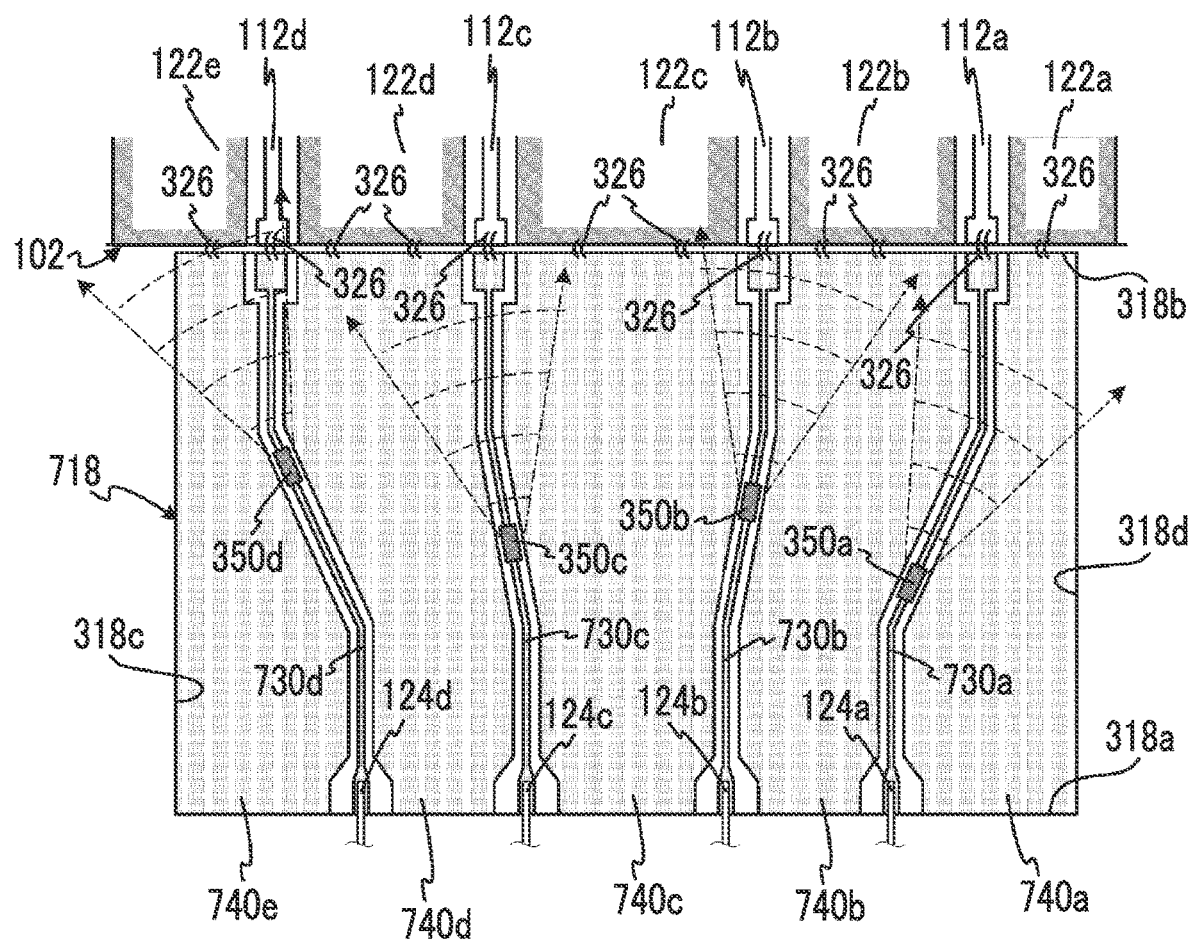
FIG. 7 is a diagram illustrating a configuration of a relay substrate according to a fourth modification example of the optical modulator according to the first embodiment.

FIG. 7 is a diagram illustrating a configuration of a relay substrate 718 according to the fourth modification example, and is a diagram corresponding to the partial detailed view of the first embodiment illustrated in FIG. 3. The relay substrate 718 can be used instead of the relay substrate 118 in the optical modulator 100 illustrated in FIG. 1. In FIG. 7, the same reference numerals as those in FIG. 3 are used for the same components as those of the relay substrate 118 illustrated in FIG. 3, and the above description of FIG. 3 will be incorporated herein.

The relay substrate 718 has the same configuration as the relay substrate 618 illustrated in FIG. 6. However, the relay substrate 718 is configured such that the parts mounting parts 350 are not arranged in a straight line in the horizontal direction illustrated in FIG. 7 (that is, not linearly arranged) unlike the relay substrate 618.

Specifically, the relay substrate 718 has the same configuration as the relay substrate 618 illustrated in FIG. 6, but is different from the relay substrate 618 in that it includes signal conductor patterns 730a, 730b, 730c, and 730d (hereinafter, collectively also referred to as a signal conductor pattern 730) instead of the signal conductor patterns 530a, 630b, 630c, and 530d. The relay substrate 718 is different from the relay substrate 618 in that it includes ground conductor patterns 740a, 740b, 740c, 740d, and 740e (hereinafter, collectively also referred to as a ground conductor pattern 740) instead of the ground conductor patterns 540a, 640b, 640c, 640d, and 540e.

The signal conductor patterns 730a, 730b, 730c, and 730d have the same configuration as the signal conductor patterns 530a, 630b, 630c, and 530d, but shapes thereof are different from those of the signal conductor patterns 530a, 630b, 630c, and 530d. The ground conductor patterns 740a, 740b, 740c, 740d, and 740e have the same configuration as the ground conductor patterns 540a, 640b, 640c, 640d, and 540e, but since the ground conductor patterns 740a, 740b, 740c, 740d, and 740e form a coplanar waveguide together with the signal conductor patterns 730a, 730b, 730c, and 730d, respectively, shapes thereof are different from those of the ground conductor patterns 540a, 640b, 640c, 640d, and 540e.

Specifically, the signal conductor patterns 730a, 730b, 730c, and 730d have the same configurations as the signal conductor patterns 530a, 630b, 630c, and 530d, respectively, but they are arranged, for example, in a zigzag position so that the parts mounting parts 350 are not arranged in a straight line. However, such a zigzag arrangement is an example, and the parts mounting parts 350 can be arranged at any positions unless three or more parts mounting parts 350 are arranged on a common straight line.

Thus, in the relay substrate 718, each parts mounting part 350 functions as a point wave source arrangement, and it is possible to prevent three or more leaked microwaves from overlapping each other and causing strong interference (for example, at a specific location on the relay substrate 718). Therefore, in the relay substrate 718, it is possible to further suppress the generation of electrical noise as compared with the relay substrate 618 illustrated in FIG. 6, and to realize good optical modulation characteristics.

In addition, from the meaning of suppressing the interference of the leaked microwaves from the three or more parts mounting parts 350, it is desirable that the parts mounting parts 350 are not only not arranged in a straight line, but are also arranged at irregular positions (random positions). The zigzag arrangement is an example of irregular arrangement.

Hereinafter, the signal conductor patterns 330, 430a, 430d, 530a, 530d, 630b, and 630c, and the signal conductor pattern 730 are collectively referred to as the signal conductor pattern 330 and the like.

Second Embodiment

Next, an optical modulator according to a second embodiment of the present invention will be described. In the optical modulator 100 according to the first embodiment described above, the arrangement pitch of the signal electrodes 112 of the optical modulation element 102 is equal to the arrangement pitch of the signal input terminal 124, but the present invention is not limited thereto. The arrangement pitch of the signal electrodes of the optical modulation element may be larger or smaller than the arrangement pitch of the signal input terminal 124. The present embodiment is a first example in which the arrangement pitch of the signal electrodes of the optical modulation element is smaller than the arrangement pitch of the signal input terminal 124.

Figure 8:
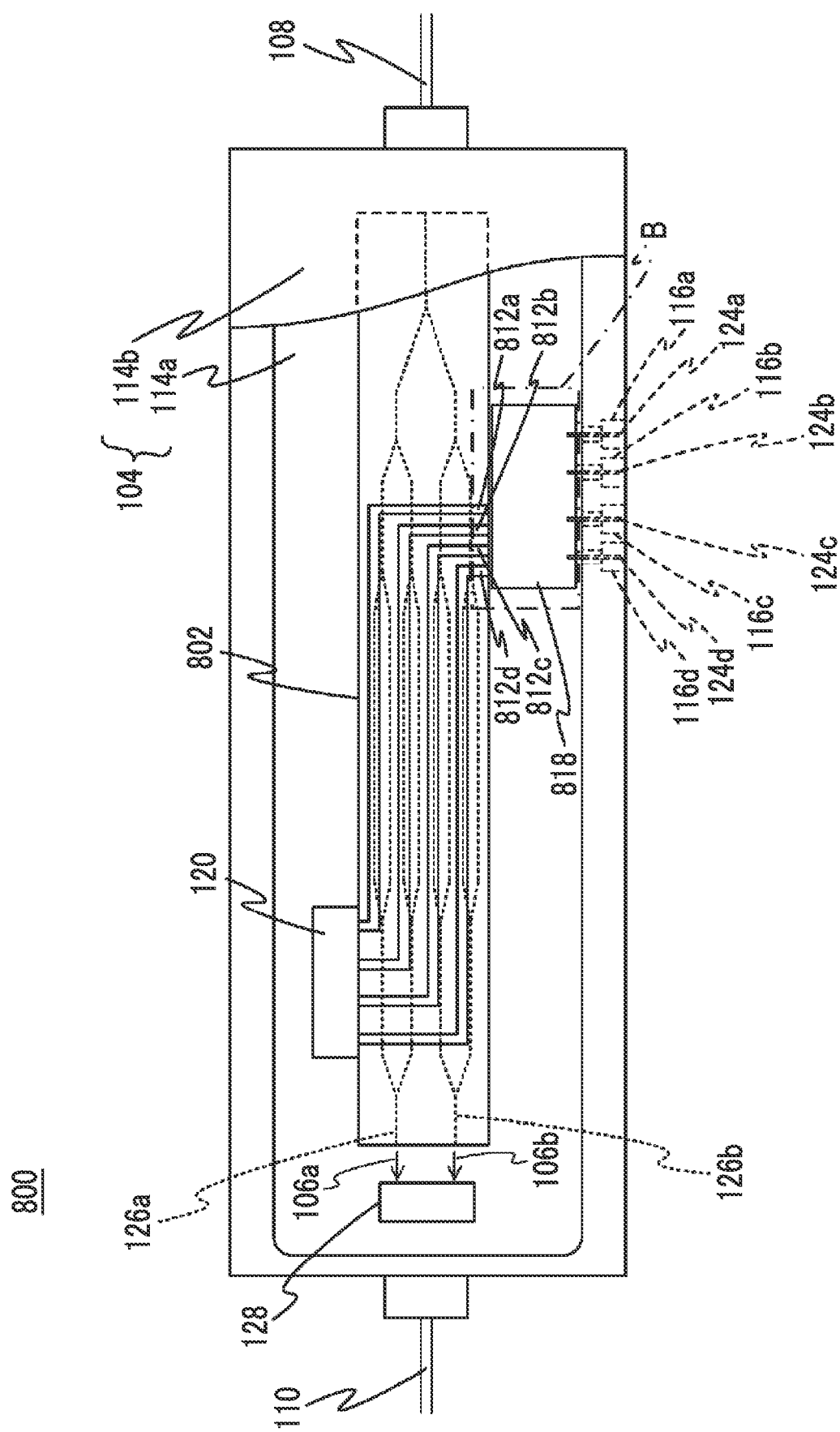
FIG. 8 is a plan view illustrating a configuration of an optical modulator according to a second embodiment.
Figure 9:
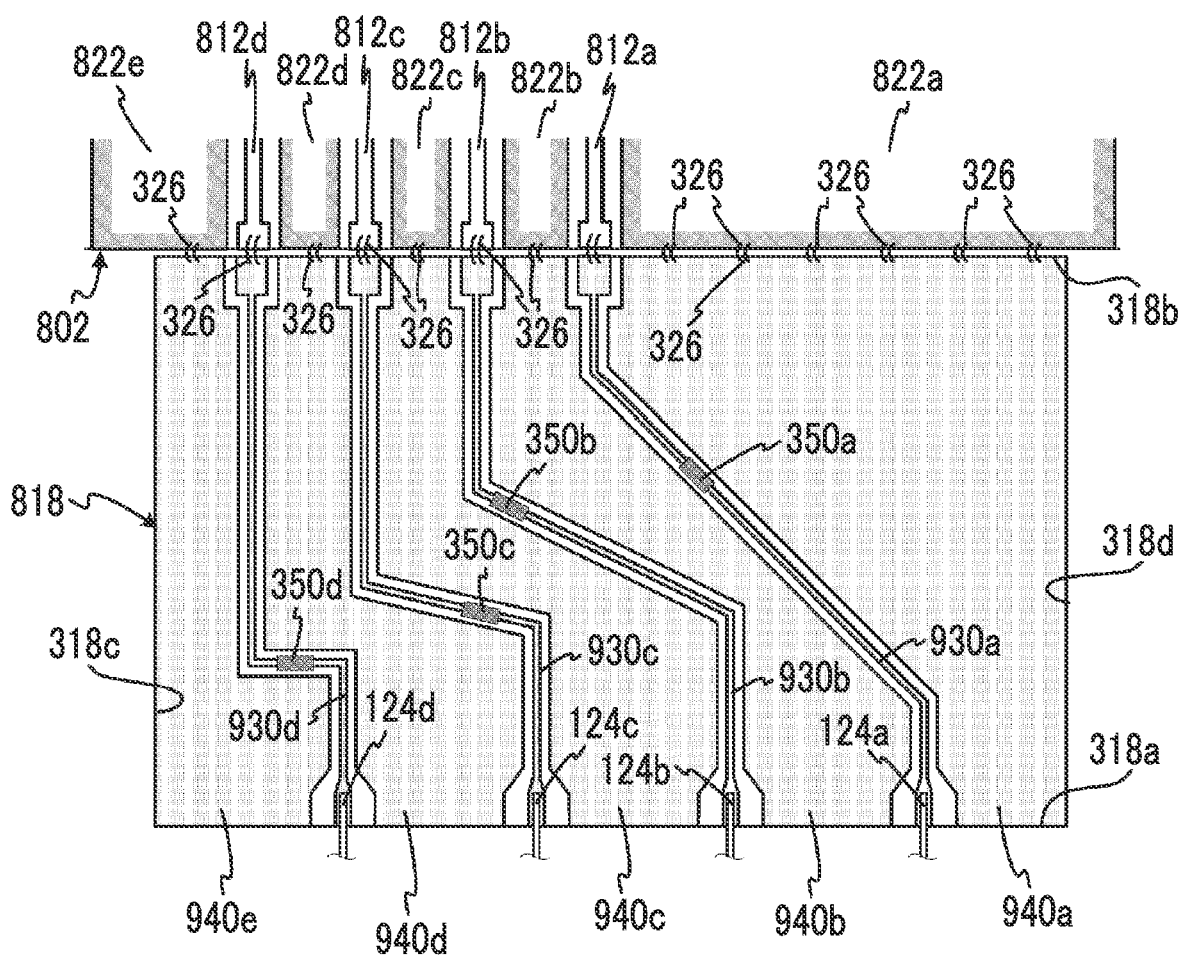
FIG. 9 is a detailed view of a part B of the optical modulator illustrated in FIG. 8.

FIG. 8 is a plan view illustrating a configuration of an optical modulator 800 according to the second embodiment of the present invention, and FIG. 9 is a partial detailed view of a part B in FIG. 8.

As will be described below, a relay substrate 818 used in the optical modulator 800 according to the present embodiment has the same characteristics as the relay substrate 718 illustrated in FIG. 7, but has a signal conductor pattern 930a or the like formed in a shape different from that of the signal conductor pattern 730a or the like of the relay substrate 718. In particular, in the present embodiment, the arrangement pitch of signal electrodes 812 of an optical modulation element 802 is narrower than the arrangement pitch of the signal input terminals 124 included in the housing 104.

In FIG. 8, the same reference numerals as those in FIG. 1 are used for the same components as those of the optical modulator 100 according to the first embodiment illustrated in FIG. 1, and the above description of FIG. 1 will be incorporated herein. The optical modulator 800 illustrated in FIG. 8 has the same configuration as the optical modulator 100 illustrated in FIG. 1, but is different from the optical modulator 100 in that it includes the optical modulation element 802 and the relay substrate 818 instead of the optical modulation element 102 and the relay substrate 118.

The optical modulation element 802 has the same configuration as the optical modulation element 102, but is different from the optical modulation element 102 in that it includes signal electrodes 812a, 812b, 812c, and 812d (hereinafter, collectively also referred to as signal electrodes 812) instead of the signal electrodes 112 and ground electrodes 822a, 822b, 822c, 822d, and 822e (hereinafter, collectively also referred to as ground electrodes 822) instead of the ground electrodes 122 (see FIG. 9).

The signal electrodes 812 have the same configuration as the signal electrodes 112, but the pitch between the signal electrodes 812 is different from the pitch between the signal electrodes 112. Further, the ground electrodes 822 have the same configuration as the ground electrodes 122, but since the ground electrodes 822 form a coplanar waveguide together with the signal electrodes 812, shapes thereof are different from the shapes of the ground electrodes 122.

FIG. 9 is a partial detailed view of the part B illustrated in FIG. 8, and illustrates a configuration of the relay substrate 818 and its surroundings in the optical modulator 800. In FIG. 9, the same reference numerals as those in FIG. 3 are used for the same components as those of the relay substrate 118 illustrated in FIG. 3, and the above description of FIG. 3 will be incorporated herein.

The relay substrate 818 has the same configuration as the relay substrate 718 illustrated in FIG. 7, but is different from the relay substrate 718 in that it includes signal conductor patterns 930a, 930b, 930c, and 930d (hereinafter, collectively also referred to as a signal conductor pattern 930) instead of the signal conductor patterns 730a, 730b, 730c, and 730d. The relay substrate 818 is different from the relay substrate 718 illustrated in FIG. 7 in that it includes ground conductor patterns 940a, 940b, 940c, 940d, and 940e (hereinafter, collectively also referred to as a ground conductor pattern 940) instead of the ground conductor patterns 740a, 740b, 740c, 740d, and 740e.

The four signal conductor patterns 930 have the following characteristics similar to the signal conductor patterns 730 of the relay substrate 718 illustrated in FIG. 7, but are formed in shapes different from those of the signal conductor patterns 730.

1) The signal propagation directions at the parts mounting part 350 are different from each other.
2) Each signal conductor pattern 930 is formed such that the signal propagation direction at the connection part with the signal input terminal 124 is different from the signal propagation direction at the parts mounting part 350.
3) Each signal conductor pattern 930 is configured such that a portion where the signal propagation direction changes to a direction different from the signal propagation direction of the parts mounting part 350 is included in a section from the connection part with the signal electrode 812 of the optical modulation element 802 to the parts mounting part 350.
4) The signal conductor pattern 930 is configured such that the parts mounting parts 350 (for example, three or more parts mounting parts 350) are not arranged in a straight line as a whole.

The ground conductor patterns 940 have the same configuration as the ground conductor patterns 740, but since the ground conductor patterns 940 form a coplanar waveguide together with the signal conductor patterns 930, shapes thereof are different from those of the ground conductor patterns 740.

Specifically, the signal conductor patterns 930a, 930b, 930c, and 930d have the same configuration as the signal conductor patterns 730a, 730b, 730c, and 730d, but the portions where the parts mounting parts 350 are arranged extend to the left in FIG. 9 or are inclined and extend to the left in FIG. 9. Thus, each of the signal input terminals 124 and each of the signal electrodes 812 of the optical modulation elements 802 arranged at clearances narrower than the arrangement pitch of the signal input terminals 124 are connected by the signal conductor patterns 930.

Further, the portions of the signal conductor patterns 930 in which the parts mounting parts 350 are arranged are formed such that their extending directions are different from each other because the angles of inclination to the left in FIG. 9 are different from each other. The portion of the signal conductor pattern 930d extending to the left in FIG. 9 is interpreted as having an angle of inclination to the left of 90 degrees.

Thus, the relay substrate 818 is configured such that the signal propagation directions at the parts mounting parts 350 are different from each other. Therefore, in the relay substrate 818, similar to the relay substrate 118 illustrated in FIG. 3, the relay substrate 418 illustrated in FIG. 4, the relay substrate 518 illustrated in FIG. 5, the relay substrate 618 illustrated in FIG. 6, and the relay substrate 718 illustrated in FIG. 7, the interference between the leaked microwaves generated from each of the parts mounting parts 350 is suppressed, and the electrical noise caused by the interference is suppressed.

Further, each of the connection parts with the signal input terminals 124 of the signal conductor patterns 930 is configured to extend in the vertical direction illustrated in FIG. 9, that is, in the direction parallel to the side edges 318c and 318d orthogonal to the signal input side 318a. Thus, the signal conductor patterns 930a, 930b, 930c, and 930d are configured such that the signal propagation directions at the connection parts with the signal input terminals 124 are different from the signal propagation directions at the parts mounting parts 350a, 350b, 350c, and 350d, respectively. Therefore, in the relay substrate 818, similar to the relay substrate 418 illustrated in FIG. 4, the relay substrate 518 illustrated in FIG. 5, the relay substrate 618 illustrated in FIG. 6, and the relay substrate 718 illustrated in FIG. 7, the interference between the leaked microwave generated from the connection part with the signal input terminal 124 and the leaked microwave generated from the parts mounting part 350 is suppressed, and the electrical noise caused by the interference is also suppressed.

Further, the signal conductor pattern 930 is formed such that a portion where the extending direction changes in a direction parallel to the side edges 318c and 318d is included in a section from the connection part with the signal electrode 812 of the optical modulation element 802 to the parts mounting part 350. Thus, the relay substrate 818 is configured such that a portion where the signal propagation direction changes in a direction different from the signal propagation direction of the parts mounting part 350 is included in these sections. Therefore, in the relay substrate 818, similar to the relay substrate 518 illustrated in FIG. 5, the relay substrate 618 illustrated in FIG. 6, and the relay substrate 718 illustrated in FIG. 7, it is suppressed that the leaked microwaves generated from the parts mounting parts 350a, 350b, 350c, and 350d are recombined to the signal conductor patterns 930a, 930b, 930c, and 930d corresponding to the parts mounting parts 350a, 350b, 350c, and 350d. As a result, for example, fluctuations in the high-frequency characteristics of each of the signal conductor patterns 930 including the parts mounting parts 350, which are electric filters, as a whole, are suppressed.

From the above description, in the relay substrate 818, similar to the relay substrate 718 illustrated in FIG. 7, the generation of electrical noise and the fluctuation of the high-frequency characteristics can be suppressed, and good modulation characteristics can be realized.

Third Embodiment

Next, an optical modulator according to a third embodiment of the present invention will be described. In the relay substrates 118, 418, 518, 618, and 718 according to the first embodiment and modification examples thereof described above, and the relay substrate 918 according to the second embodiment, the signal conductor patterns 330 and the like and 940 are configured as shapes including bending, but of course, the present invention is not limited to such bending shapes. These signal conductor patterns 330 and the like and 940 can be configured by using a curve instead of bending.

The present embodiment is a second example in which the arrangement pitch of the signal electrodes of the optical modulation element is smaller than the arrangement pitch of the signal input terminals 124, and in particular, as will be described later, the curved portions of signal conductor patterns 1130a, 1130b, 1130c, and 1130d of a relay substrate 1018 are configured by curves instead of bending.

Figure 10:
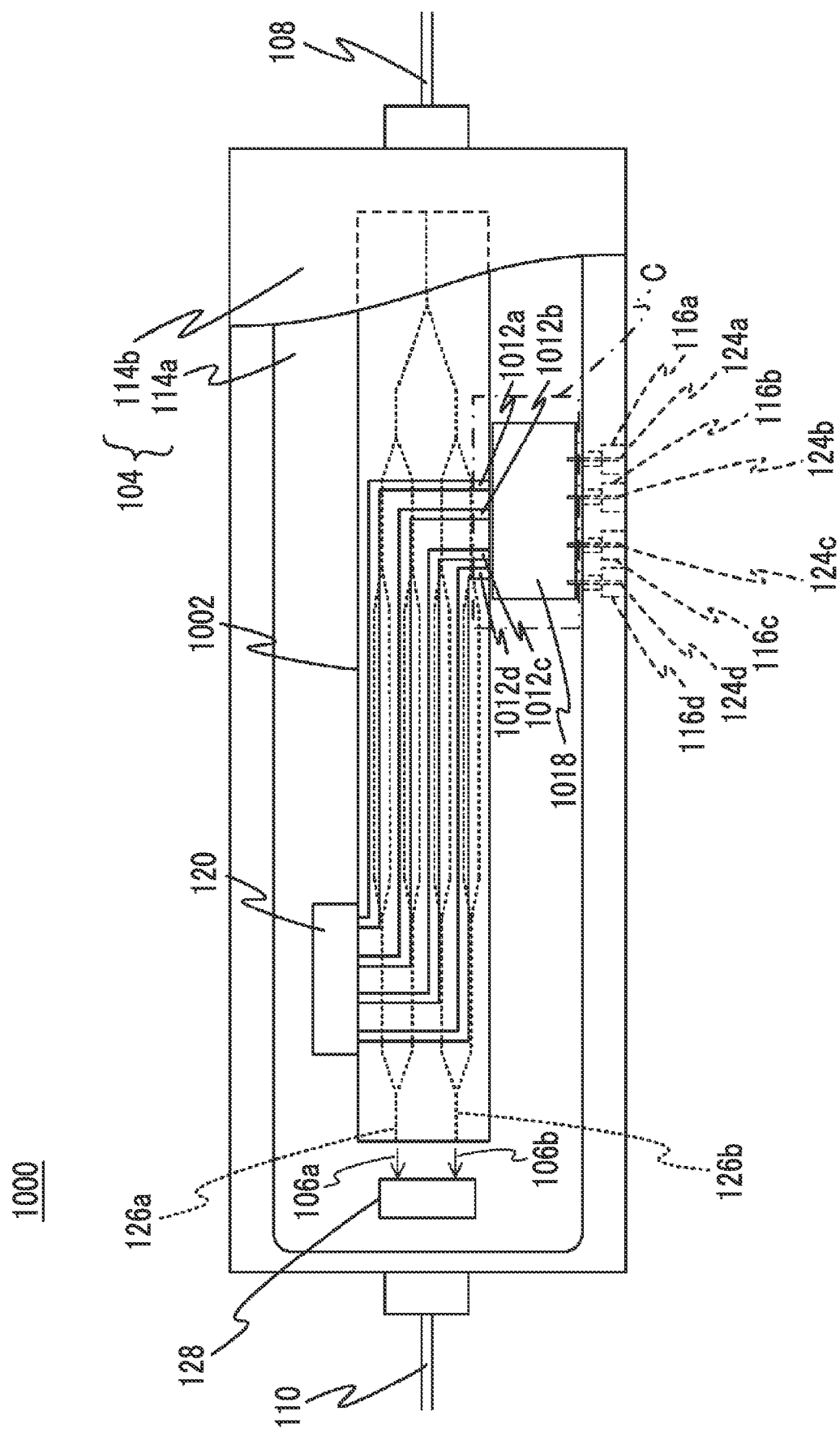
FIG. 10 is a plan view illustrating a configuration of an optical modulator according to a third embodiment.
Figure 11:
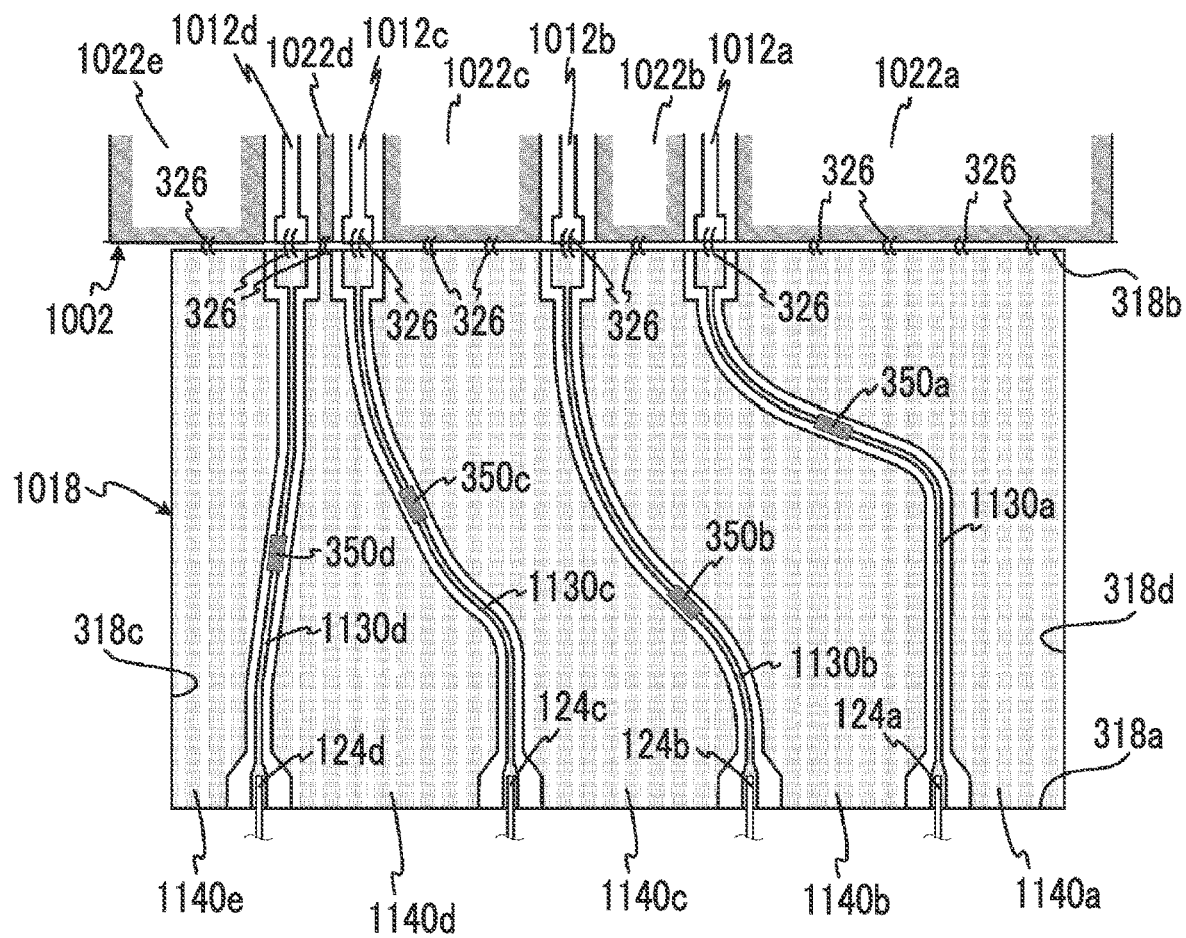
FIG. 11 is a detailed view of a part C of the optical modulator illustrated in FIG. 10.

FIG. 10 is a plan view illustrating a configuration of an optical modulator 1000 according to the third embodiment of the present invention, and FIG. 11 is a partial detailed view of a part C in FIG. 10. In FIG. 10, the same reference numerals as those in FIG. 1 are used for the same components as those of the optical modulator 100 according to the first embodiment illustrated in FIG. 1, and the above description of FIG. 1 will be incorporated herein. The optical modulator 1000 illustrated in FIG. 10 has the same configuration as the optical modulator 100 illustrated in FIG. 1, but is different from the optical modulator 100 in that it includes an optical modulation element 1002 and the relay substrate 1018 instead of the optical modulation element 102 and the relay substrate 118.

The optical modulation element 1002 has the same configuration as the optical modulation element 102, but is different from the optical modulation element 102 in that it includes signal electrodes 1012a, 1012b, 1012c, and 1012d (hereinafter, collectively also referred to as signal electrodes 1012) instead of the signal electrodes 112 and ground electrodes 1022a, 1022b, 1022c, 1022d, and 1022e (hereinafter, collectively also referred to as ground electrodes 1022) instead of the ground electrodes 122.

The signal electrodes 1012 have the same configuration as the signal electrodes 112, but the pitch between the signal electrodes 1012 is different from the pitch between the signal electrodes 112. Further, the ground electrodes 1022 have the same configuration as the ground electrodes 122, but since the ground electrodes 1022 form a coplanar waveguide together with the signal electrodes 1012, shapes thereof are different from the shapes of the ground electrodes 122.

FIG. 11 is a partial detailed view of the part C illustrated in FIG. 10, and illustrates a configuration of the relay substrate 1018 and its surroundings in the optical modulator 1000. In FIG. 11, the same reference numerals as those in FIG. 3 are used for the same components as those of the relay substrate 118 illustrated in FIG. 3, and the above description of FIG. 3 will be incorporated herein.

The relay substrate 1018 has the same configuration as the relay substrate 718 illustrated in FIG. 7, but is different from the relay substrate 718 in that it includes signal conductor patterns 1130a, 1130b, 1130c, and 1130d (hereinafter, collectively also referred to as a signal conductor pattern 1130) instead of the signal conductor patterns 730a, 730b, 730c, and 730d. The relay substrate 1018 is different from the relay substrate 718 illustrated in FIG. 7 in that it includes ground conductor patterns 1140a, 1140b, 1140c, 1140d, and 1140e (hereinafter, collectively also referred to as a ground conductor pattern 1140) instead of the ground conductor patterns 740a, 740b, 740c, 740d, and 740e.

The four signal conductor patterns 1130 have the abovementioned four characteristics similar to the signal conductor patterns 930 of the relay substrate 818 according to the second embodiment, which is illustrated in FIG. 9, but are formed in shapes different from those of the signal conductor patterns 930.

The ground conductor patterns 1140 have the same configuration as the ground conductor patterns 740, but since the ground conductor patterns 1140 form a coplanar waveguide together with the signal conductor patterns 1130, shapes thereof are different from those of the ground conductor patterns 740.

The signal conductor patterns 1130 have the same configuration as the signal conductor patterns 730, but the shapes thereof are different from those of the signal conductor patterns 730, and the curved portions are configured by curves instead of bending.

The signal propagation directions of the portions of the signal conductor patterns 1130 in which the parts mounting parts 350 are arranged are different from each other. More specifically, the extending directions of the portions of the signal conductor patterns 1130a, 1130b, and 1130c in which the parts mounting parts 350a, 350b, and 350c are arranged are inclined to the left in FIG. 11, and these inclination angles are different from each other. Further, the extending direction of the portion of the signal conductor pattern 1130d in which the parts mounting part 350d is arranged is inclined to the right in FIG. 11.

Thus, in the relay substrate 1018, similar to the relay substrate 118 illustrated in FIG. 3, the relay substrate 418 illustrated in FIG. 4, the relay substrate 518 illustrated in FIG. 5, the relay substrate 618 illustrated in FIG. 6, the relay substrate 718 illustrated in FIG. 7, and the relay substrate 818 illustrated in FIG. 9, the interference between the leaked microwaves generated from each of the parts mounting parts 350 is suppressed, and the electrical noise caused by the interference is suppressed.

Further, each of the connection parts with the signal input terminals 124 of the signal conductor patterns 1130 is configured to extend in the vertical direction illustrated in FIG. 11, that is, in the direction parallel to the side edges 318c and 318d orthogonal to the signal input side 318a. Thus, the signal conductor patterns 1130a, 1130b, 1130c, 1130d are configured such that the signal propagation directions at the connection parts with the signal input terminals 124 are different from the signal propagation directions at the parts mounting parts 350a, 350b, 350c, and 350d, respectively.

Therefore, in the relay substrate 1018, similar to the relay substrate 418 illustrated in FIG. 4, the relay substrate 518 illustrated in FIG. 5, the relay substrate 618 illustrated in FIG. 6, the relay substrate 718 illustrated in FIG. 7, and the relay substrate 818 illustrated in FIG. 9, the interference between the leaked microwave generated from the connection part between the signal conductor pattern 1130 and the signal input terminal 124 and the leaked microwave generated from the parts mounting part 350 is suppressed, and the electrical noise caused by the interference is also suppressed.

Further, the signal conductor pattern 1130 is formed such that a portion where the extending direction changes in a direction parallel to the side edges 318c and 318d is included in a section from the connection part with the signal electrode 1012 of the optical modulation element 1002 to the parts mounting part 350. Thus, the relay substrate 1018 is configured such that a portion where the signal propagation direction changes in a direction different from the signal propagation direction of the parts mounting part 350 is included in these sections. Therefore, in the relay substrate 1018, similar to the relay substrate 518 illustrated in FIG. 5, the relay substrate 618 illustrated in FIG. 6, the relay substrate 718 illustrated in FIG. 7, and the relay substrate 818 illustrated in FIG. 9, it is suppressed that the leaked microwaves generated from the parts mounting parts 350a, 350b, 350c, and 350d are recombined to the signal conductor patterns 1130a, 1130b, 1130c, and 1130d corresponding to the parts mounting parts 350a, 350b, 350c, and 350d. As a result, for example, fluctuations in the high-frequency characteristics of each of the signal conductor patterns 1130 including the parts mounting parts 350, which are electric filters, as a whole, are suppressed.

From the above description, in the relay substrate 1018, similar to the relay substrate 718 illustrated in FIG. 7, the generation of electrical noise and the fluctuation of the high-frequency characteristics can be suppressed, and good modulation characteristics can be realized.

Fourth Embodiment

Next, a fourth embodiment of the present invention will be described. The present embodiment is an optical transmission apparatus on which the optical modulator 100 including the relay substrate 118 according to the first embodiment is mounted. This configuration is an example, and instead of the optical modulator 100 including the relay substrate 118, the optical modulator 100 using the relay substrates 418, 518, 618, and 718 according to the first to fourth modification examples and the optical modulators 800 and 1000 according to the second and third embodiments including the relay substrates 818 and 1018, respectively, may be mounted on the optical transmission apparatus.

Figure 12:
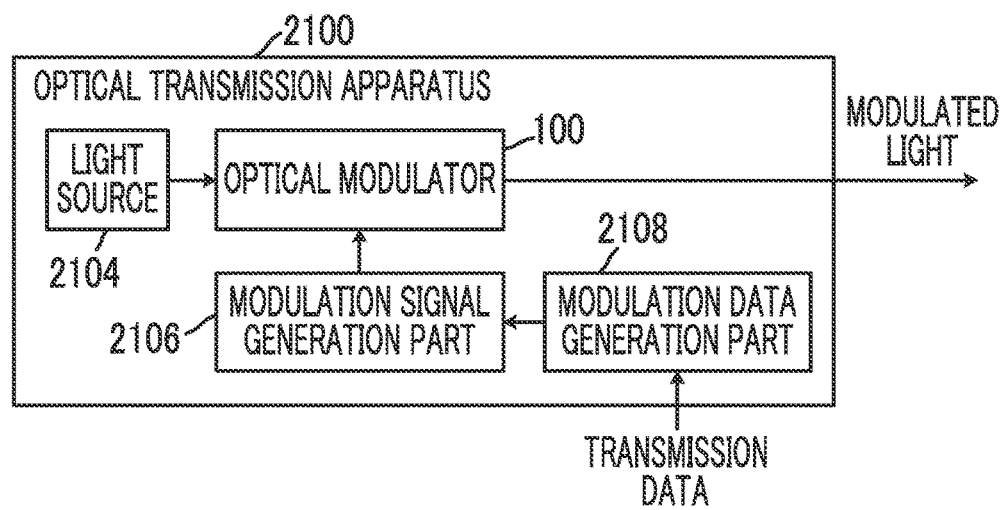
FIG. 12 is a diagram illustrating a configuration of an optical transmission apparatus according to a fourth embodiment of the present invention.
Figure 13:
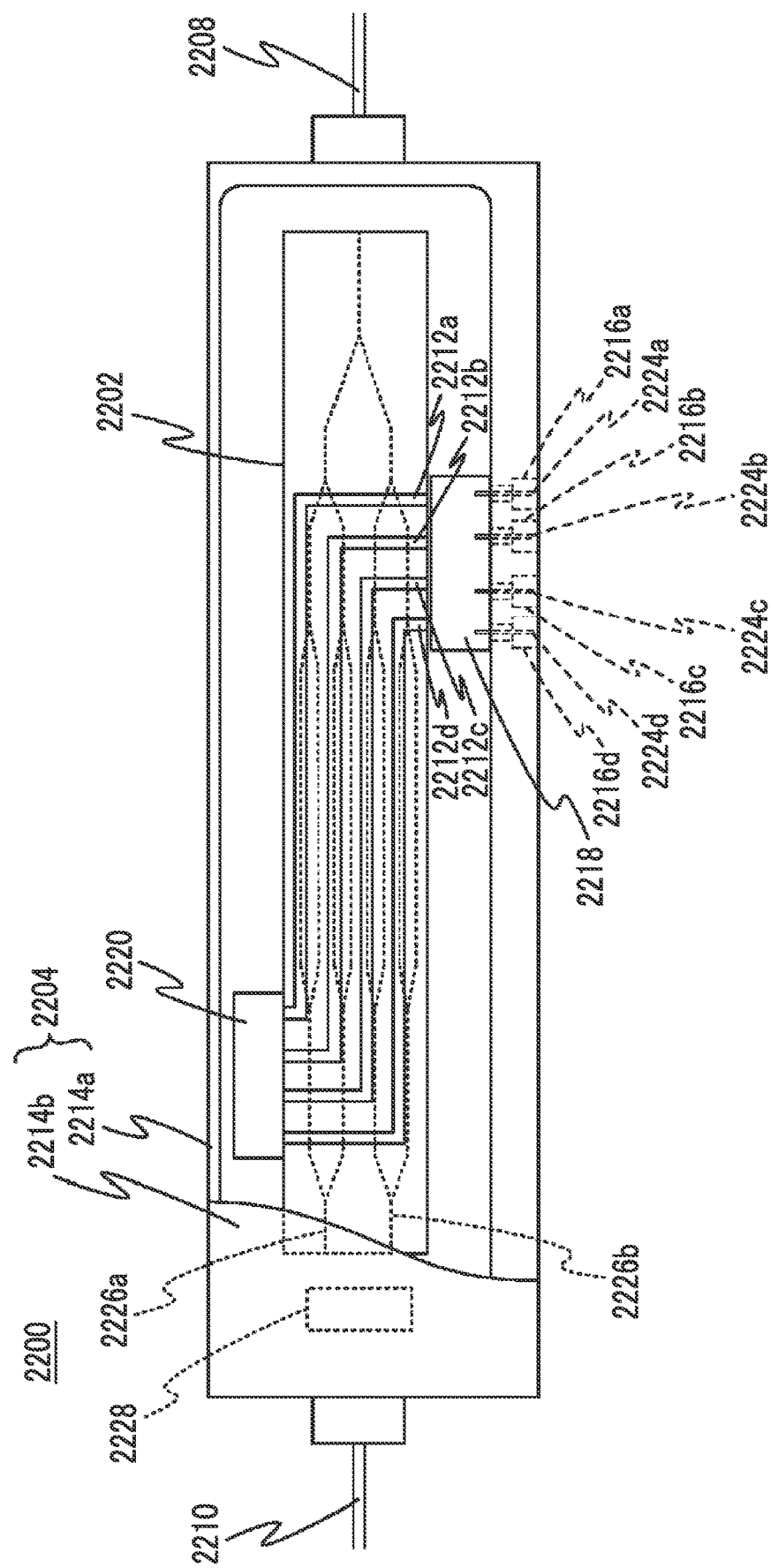
FIG. 13 illustrates an example of a configuration of an optical modulator in the related art.
Figure 14:
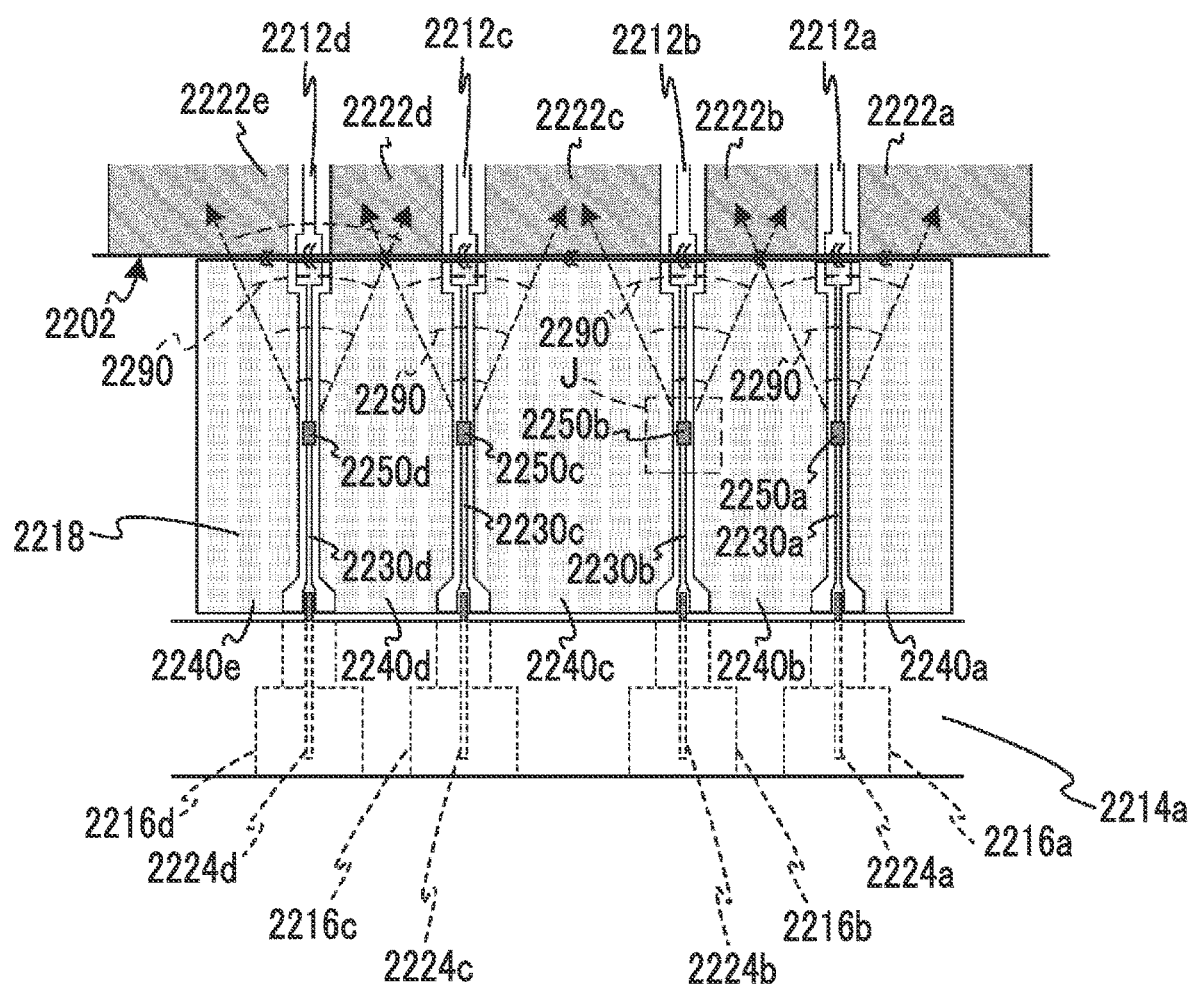
FIG. 14 is a partial detailed view illustrating the periphery of a relay substrate in the optical modulator in the related art.
Figure 15:
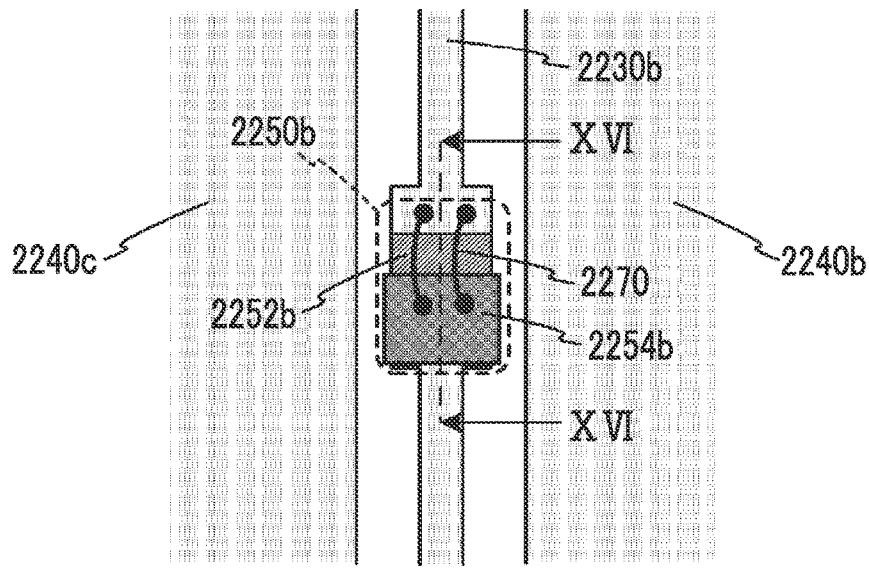
FIG. 15 is a partial detailed view illustrating the details of a part J illustrated in FIG. 14.
Figure 16:
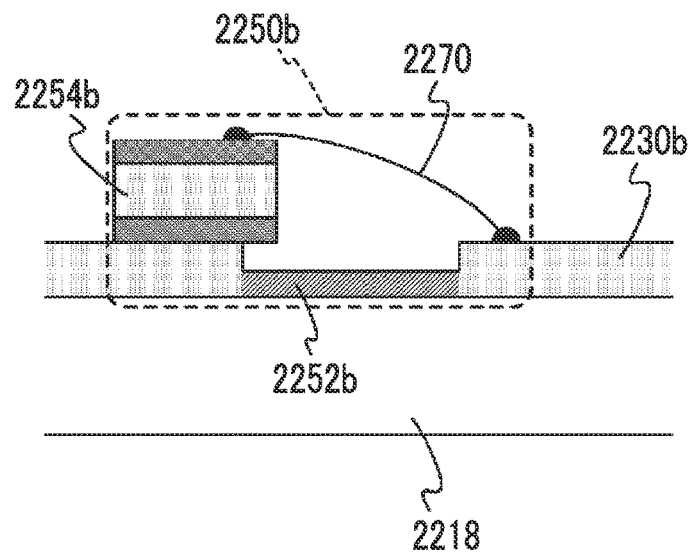
FIG. 16 is a cross-sectional view taken along arrow line XVI-XVI of the partial detailed view illustrated in FIG. 15.

FIG. 12 is a diagram illustrating a configuration of an optical transmission apparatus according to the present embodiment. An optical transmission apparatus 2100 includes an optical modulator 100, a light source 2104 that inputs light to the optical modulator 100, a modulation signal generation part 2106, and a modulation data generation part 2108.

The modulation data generation part 2108 receives transmission data given from the outside, generates modulation data for transmitting the transmission data (for example, data obtained by converting or processing transmission data into a predetermined data format), and outputs the generated modulation data to the modulation signal generation part 2106.

The modulation signal generation part 2106 is an electronic circuit (drive circuit) that outputs an electrical signal for causing the optical modulator 100 to perform a modulation operation, generates a modulation signal which is a high-frequency signal for making the optical modulator 100 perform an optical modulation operation according to the modulation data, based on the modulation data which is output by the modulation data generation part 2108, and inputs the generated modulation signal to the optical modulator 100. The modulation signal includes four high-frequency electrical signals corresponding to the four signal electrodes 112a, 112b, 112c, and 112d of the optical modulation element 102 provided in the optical modulator 100.

The four high-frequency electrical signals are input from the signal input terminals 124a, 124b, 124c, and 124d of the respective electrical connectors 116a, 116b, 116c, and 116d of the optical modulator 100 to the signal conductor patterns 330a, 330b, 330c, and 330d on the relay substrate 118, and are input to the signal electrodes 112a, 112b, 112c, and 112d of the optical modulation element 102 via the signal conductor pattern 330a or the like.

Thus, the light output from the light source 2104 is, for example, DP-QPSK modulated by the optical modulator 100 and output as modulated light from the optical transmission apparatus 2100.

In particular, in the optical transmission apparatus 2100, it is possible to suppress interference between leaked microwaves that may occur from the parts mounting part 350 in the relay substrate 118 of the optical modulator 100, to ensure good modulation characteristics, and to realize good transmission characteristics. Further, in the optical transmission apparatus 2100, for example, when the optical modulator 100 including the relay substrate 518 according to the second modification example illustrated in FIG. 5 is used instead of the optical modulator 100 including the relay substrate 118, it is possible to suppress the recombination of the leaked microwaves generated from the parts mounting parts 350 to their own signal conductor patterns 330 and the like, and to also suppress fluctuations of the high-frequency characteristics as a whole including the parts mounting parts 350, which are electric filters, for example. As a result, even better modulation characteristics can be realized in the optical modulator 100, and good transmission characteristics in the optical transmission apparatus 2100 can be realized.

The present invention is not limited to the configurations of the embodiments and the modification examples described above, and can be realized in various aspects without departing from the gist thereof.

For example, in the first embodiment and the modification examples thereof and the second and third embodiments described above, it is assumed that all of the signal conductor patterns 330 and the like, 830, and 1130 are provided with one parts mounting part 350, but the present invention is not limited thereto. The parts mounting part 350 may be provided in at least two (that is, a plurality of) signal conductor patterns of the signal conductor patterns 330 and the like, 830, and 1130 or a plurality of parts mounting parts 350 may be provided for the same signal conductor pattern. That is, the plurality of signal conductor patterns may be provided with at least one parts mounting part 350. When a plurality of parts mounting parts are provided in the same signal conductor pattern, it is desirable to form the signal conductor pattern such that the signal propagation directions at each of the parts mounting parts are also different from each other.

Further, in FIGS. 5, 6, and 7, for example, the signal conductor pattern 530a is configured such that the signal propagation direction (first signal propagation direction) of the parts mounting part 350a is different from the signal propagation direction (second signal propagation direction) at the connection part with the signal input terminal 124a and a portion where the signal propagation direction changes to the third signal propagation direction different from the first signal propagation direction is included in the section from the connection part with the signal electrode 112a to the parts mounting part 350a, but the present invention is not limited thereto. One signal conductor pattern 330 may be configured such that the first signal propagation direction and the second signal propagation direction of the parts mounting part 350 are different from each other, or a portion where the signal propagation direction changes in the third signal propagation direction is included in the section from the connection part with the signal electrode 112 to the parts mounting part 350.

Further, in the above-described embodiment, the optical modulation elements 102, 802, and 1002 is a DP-QPSK modulator configured by using an LN substrate, but the present invention is not limited thereto. The optical modulation elements 102, 802, and 1002 can perform any modulation method using two modulated light beams, each of which is modulated by two sets of high-frequency signals forming a pair, for example, QAM modulation or the like, instead of DP-QPSK modulation. Further, the optical modulation elements 102, 802, and 1002 may be optical modulation elements configured by using a semiconductor substrate instead of the LN substrate.

Further, in the above-described embodiment, the optical modulation element 102 and the like and the relay substrate 118 and the like are accommodated in the housing 104, but in addition to these, an electronic circuit element (driver element) for operating the optical modulation element 102 and the like may also be accommodated in the housing 104.

As described above, the optical modulator 100 according to the above-described first embodiment includes the optical modulation element 102 including a plurality of signal electrodes 112, the relay substrate 118, and the housing 104 in which the optical modulation element 102 and the relay substrate 118 are accommodated. The optical modulation element 102 is configured to generate two modulated light beams 106a and 106b, each of which is modulated by two sets of electrical signals, each including two electrical signals. The relay substrate 118 is formed with a plurality of signal input terminals 124 that input an electrical signal applied to each of the signal electrodes 112, a plurality of signal conductor patterns 330 that electrically connect the signal input terminals 124 to the signal electrodes 112, and a plurality of ground conductor patterns 340. Further, the relay substrate 118 is configured to propagate the above two sets of electrical signals by two pairs of signal conductor patterns 330, each of which is composed of two adjacent signal conductor patterns 330. The at least two signal conductor patterns 330 have at least one parts mounting part 530 including an electrical circuit element, and are configured such that the first signal propagation directions, which are the signal propagation direction at the parts mounting parts 530, are different from each other.

According to this configuration, in the optical modulator 100 in which the signal conductor pattern 330 on the relay substrate 118 is provided with the parts mounting part 350 composed of an electrical circuit element such as an electric filter, it is possible to suppress electrical noise caused by the interference between the leaked microwaves that may be generated from the parts mounting part 350, and to realize good modulation characteristics.

Further, the optical modulator 100 can include the relay substrate 418. In the relay substrate 418, at least one of the signal conductor patterns 330 and the like including the parts mounting parts 350 is configured such that the second signal propagation direction, which is the signal propagation direction at the connection part with the signal input terminal 124, is different from the first signal propagation direction.

According to this configuration, for example, it is possible to suppress the generation of electrical noise caused by the leaked microwaves generated from the connection part between the signal conductor pattern 430d and the signal input terminal 124d interfering with the leaked microwaves generated from the parts mounting part 350d of the signal conductor pattern 430d, and to realize even better modulation characteristics.

Further, the optical modulator 100 can include the relay substrate 518. In the relay substrate 518, at least one of the signal conductor patterns 330 and the like including the parts mounting parts 350 is configured such that a portion where the signal propagation direction changes to the third signal propagation direction different from the first signal propagation direction is included in the section from the connection part with the signal electrode 112 to the parts mounting part 350.

According to this configuration, for example, in the signal conductor pattern 530d, it is possible to suppress the leaked microwaves generated from the parts mounting part 350d from recombination to its own signal conductor pattern 530d in the above section. Thus, in the optical modulator 100 including the relay substrate 518, it is possible to suppress fluctuations in the high-frequency characteristics of the signal conductor pattern 330d as a whole including the parts mounting part 350d due to the recombination, and to realize even better modulation characteristics.

Further, in the optical modulator 100, the at least two signal conductor patterns 330 and the like including the parts mounting part 350 include the two signal conductor patterns 330 and the like forming the pair, and the first signal propagation directions are different from each other between the two signal conductor patterns 330 and the like forming the same pair.

In general, two adjacent signal conductor patterns 330 and the like propagating two paired high-frequency electrical signals, respectively, are susceptible to electrical noise and fluctuations in high-frequency characteristics. On the other hand, according to the above configuration, it is possible to suppress interference between leaked microwaves generated from the parts mounting part 530 between adjacent signal conductor patterns 330 and the like propagating such paired high-frequency electrical signals, and to realize good modulation characteristics.

Further, the optical modulator 100 is configured such that all signal conductor patterns 330 and the like include at least one parts mounting part 350, and the two signal conductor patterns 330 and the like forming the same pair all have the first signal propagation directions different from each other.

According to this configuration, in a configuration in which all signal conductor patterns 330 and the like include the parts mounting part 350, it is possible to suppress interference between leaked microwaves generated from these parts mounting parts 350, and to realize good modulation characteristics.

Further, the optical modulator 100 can include the relay substrate 618. In the relay substrate 618, all the signal conductor patterns 330 and the like are configured such that the first signal propagation direction is different from the second signal propagation direction and the third signal propagation direction. Here, the first signal propagation direction does not necessarily have to be different from both the second signal propagation direction and the third signal propagation direction, and may be different from either the second signal propagation direction or the third signal propagation direction.

According to this configuration, in each of all the signal conductor patterns 330 and the like, it is possible to suppress the electrical noise caused by the leaked microwave, and/or to suppress fluctuations in high-frequency characteristics of the signal conductor patterns 330 and the like due to recombination of leaked microwaves, and to realize good modulation characteristics.

Further, the optical modulator 100 is configured such that all signal conductor patterns 330 include parts mounting parts 350, and the first signal propagation directions of the parts mounting parts 350 are different from each other. According to this configuration, in all the signal conductor patterns 330 and the like, it is possible to suppress interference between leaked microwaves generated from the parts mounting parts 350, and to realize good modulation characteristics.

Further, the optical modulator 100 can include the relay substrate 718. In the relay substrate 718, the parts mounting parts 350 provided in each of all the signal conductor patterns 330 and the like are not arranged on a common straight line on the relay substrate 718. According to this configuration, it is possible to prevent strong interference of leaked microwaves from occurring at a specific location on the relay substrate 718, for example, and to realize good modulation characteristics.

Further, in the optical modulator 100, the parts mounting part constitutes an electric filter. According to this configuration, it is possible to improve the modulation characteristics in the design by providing an electric filter having a desired frequency characteristic as the parts mounting part 350 in the signal conductor pattern 330 or the like, and to suppress the interference and recombination of the leaked microwaves so that the modulation characteristics designed above can be realized more faithfully.

Further, the optical transmission apparatus 2100 according to the fourth embodiment described above includes the optical modulator 100 using any of the relay substrates described in the first embodiment or the modification examples thereof or the optical modulator 800 or 1000 according to the second or third embodiment, and includes the modulation signal generation part 2106 which is an electronic circuit that outputs an electrical signal for causing the corresponding optical modulator to perform a modulation operation, and the like. According to this configuration, for example, the influence of leaked microwaves, which becomes noticeable as the transmission rate is increased, is suppressed and electrical noise and/or fluctuations in high-frequency characteristics are effectively reduced, so it is possible to realize stable and good transmission characteristics.

REFERENCE SIGNS LIST 100, 800, 1000, 2200 . . . optical modulator
102, 802, 1002, 2202 . . . optical modulation element
104, 2204 . . . housing
106a, 106b . . . modulated light
108, 2208 . . . input optical fiber
110, 2210 . . . output optical fiber
112, 112a, 112b, 112c, 112d, 812, 812a, 812b, 812c, 812d, 1012, 1012a, 1012b, 1012c, 1012d, 2212, 2212a, 2212b, 2212c, 2212d . . . signal electrode
114a, 2214a . . . case
114b, 2214b . . . cover
116, 116a, 116b, 116c, 116d, 2216, 2216a, 2216b, 2216c, 2216d . . . electrical connector
118, 418, 518, 618, 718, 818, 1018, 2218 . . . relay substrate
120, 2220 . . . terminator 122, 122a, 122b, 122c, 122d, 122e, 822, 822a, 822b, 822c, 822d, 822e, 1022, 1022a, 1022b, 1022c, 1022d, 1022e, 2222a, 2222b, 2222c, 2222d, 2222e . . . ground electrode
124, 124a, 124b, 124c, 124d, 2224, 2224a, 2224b, 2224c, 2224d . . . signal input terminal
126a, 126b . . . output optical waveguide
318a . . . signal input side
318b . . . signal output side
318c, 318d . . . side edge
326, 2270 . . . conductor wire
330, 330a, 330b, 330c, 330d, 430a, 430d, 530a, 530d, 630b, 630c, 730, 730a, 730b, 730c, 730d, 930, 930a, 930b, 930c, 930d, 1130, 1130a, 1130b, 1130c, 1130d, 2230, 2230a, 2230b, 2230c, 2230d . . . signal conductor pattern
340, 340a, 340b, 340c, 340d, 340e, 440a, 440b, 440d, 440e, 540a, 540b, 540d, 540e, 640b, 640c, 640d, 740, 740a, 740b, 740c, 740d, 740e, 940, 940a, 940b, 940c, 940d, 940e, 1140, 1140a, 1140b, 1140c, 1140d, 1140e, 2240a, 2240b, 2240c, 2240d, 2240e . . . ground conductor pattern
350, 350a, 350b, 350c, 350d . . . parts mounting part
2100 . . . optical transmission apparatus
2104 . . . light source
2106 . . . modulation signal generation part
2108 . . . modulation data generation part
2252b . . . thin film resistor
2254b . . . capacitor
2290 . . . leaked microwave

The invention claimed is:
1. An optical modulator comprising:
an optical modulation element that is configured to generate two modulated light beams, each of which is modulated by two sets of electrical signals, each set including two electrical signals, and that includes a plurality of signal electrodes;

a plurality of signal input terminals, each of which inputs an electrical signal to be applied to each of the signal electrodes;

a relay substrate on which a plurality of signal conductor patterns that electrically connect the signal input terminals to the signal electrodes and a plurality of ground conductor patterns are formed; and a housing in which the optical modulation element and the relay substrate are accommodated, wherein each of the plurality of signal conductor patterns include at least one parts mounting part including an electrical circuit element, in the relay substrate, each of the two sets of electrical signals is propagated by each of two pairs of signal conductor patterns each formed by two adjacent signal conductor patterns of the plurality of signal conductor patterns, the two adjacent signal conductor patterns, of the plurality of signal conductor patterns, constituting at least one pair of signal conductor patterns among the two pairs of signal conductor patterns are configured such that first signal propagation directions, which are signal propagation directions at the parts mounting parts, point in different directions away from each other.

2. The optical modulator according to claim 1, wherein at least one of the two adjacent signal conductor patterns, of the plurality of signal conductor patterns, constituting at least one pair of signal conductor patterns among the two pairs of signal conductor patterns is configured such that a second signal propagation direction, which is a signal propagation direction at a connection part with the signal input terminal, is different from the first signal propagation direction, and/or is configured such that a portion where the signal propagation direction changes to a third signal propagation direction different from the first signal propagation direction is included in a section from a connection part with the signal electrode to the parts mounting part.

3. The optical modulator according to claim 1, wherein all of the plurality of signal conductor patterns included in the two pairs of signal conductor patterns are configured such that a second signal propagation direction, which is a signal propagation direction at a connection part with the signal input terminal, is different from the first signal propagation direction, and/or are configured such that a portion where the signal propagation direction changes to a third signal propagation direction different from the first signal propagation direction is included in a section from a connection part with the signal electrode to the parts mounting part.

4. The optical modulator according to claim 1, wherein all of the plurality of signal conductor patterns included in the two pairs of signal conductor patterns are configured such that their first signal propagation directions point in different directions away from each other.

5. The optical modulator according to claim 1, wherein the parts mounting parts provided in each of all of the plurality of signal conductor patterns are not arranged on a common straight line in the relay substrate.

6. The optical modulator according to claim 1, wherein the electrical circuit element constituting the parts mounting part constitutes an electric filter.

7. An optical transmission apparatus comprising:

the optical modulator according to claim 1; and an electronic circuit that outputs an electrical signal for causing the optical modulator to perform a modulation operation.

8. The optical modulator according to claim 1, wherein the two pairs of signal conductor patterns are configured such that the first signal propagation direction of each of the two signal conductor patterns constituting one of the pair of signal conductor patterns, and the first signal propagation direction of each of the two signal conductor patterns constituting the other pair of signal conductor patterns point in different directions away from each other.

\* \* \* \* \*